United States Patent [19]
McClellan

[11] 3,823,387
[45] July 9, 1974

[54] INFORMATION STORAGE AND RETRIEVAL SYSTEM

[75] Inventor: Ronald E. McClellan, Cinnaminson, N.J.

[73] Assignee: Ultronic Systems Corp., Moorestown, Del.

[22] Filed: Dec. 4, 1972

[21] Appl. No.: 311,841

[52] U.S. Cl. .......... 340/172.5
[51] Int. Cl. .......... G11c 7/00
[58] Field of Search .......... 340/172.5

[56] References Cited

UNITED STATES PATENTS

| | | | |
|---|---|---|---|
| 3,296,597 | 1/1967 | Scantlin et al. | 340/172.5 |
| 3,307,156 | 2/1967 | Durr | 340/172.5 |
| 3,500,327 | 3/1970 | Belcher et al. | 340/172.5 |
| 3,555,520 | 1/1971 | Helvig et al. | 340/172.5 |

*Primary Examiner*—Raulfe B. Zache
*Assistant Examiner*—Paul R. Woods
*Attorney, Agent, or Firm*—Peter Xiahos; Elmer J. Nealon; Norman J. O'Malley

[57] ABSTRACT

An information storage and retrieval "slave" system for storing, processing, and supplying information to subscribers relating to securities and commodities traded on various security and commodity exchanges. The information storage and retrieval system includes a storage drum on which there is stored several classes of security and commodity information. Information may be read from, or new information written onto, the storage drum by means of a plurality of input devices which commmunicate with the drum by means including a read/write interface. The read/write interface includes a plurality of "read" and "write" coincidence circuits each of which is assigned to and used in the execution of a particular type of read or write operation initiated by an input device. Before a particular read or write operation may be initiated by an input device, the availability of the "read" or "write" circuit assigned to that operation, that is, whether it is busy or is not busy with another operation, must first be checked. This check is executed by status-determining circuitry in the read/write interface in response to a request message initiated by the input device and transferred to the read/write interface by a traffic controller which scans the input devices in succession looking for active request messages. In the event the read or write circuit is available, an acknowledge signal is produced by the read/write interface and transmitted to the input device via the traffic controller. The input device operates in response to the acknowledge signal produced by the read/write interface to produce an input read or write message which is then transferred to the read/write interface by the traffic controller and processed by the read/write interface either to read information from the drum or to write information onto the drum.

25 Claims, 5 Drawing Figures

INFORMATION STORAGE AND RETRIEVAL SYSTEM

BACKGROUND OF THE INVENTION

The present invention relates to an information storage and retrieval system, and, more particularly, to an information storage and retrieval "slave" system for storing, processing, and supplying information to subscribers relating to securities and commodities traded on various security and commodity exchanges.

Various systems for providing information to subscribers relating to securities and commodities are known to those skilled in the art. In one such system, information pertaining to securities and commodities traded on various security and commodity exchanges is transmitted from an information processing center, such as a master computer, to a remote "slave" station and then written onto a storage drum provided within the slave station. Certain portions of the information stored on the drum, termed "data records" and including price, statistical and transaction information, may then be read selectively from the drum by means of display units located at subscriber offices and accessing the storage drum by read request messages initiated at the display units and communicated to corresponding retriever units coupled to the drum. Typically, a read request message initiated at a display unit (e.g., a video CRT display terminal) at a subscriber's office includes a stock identification code identifying a particular security or commodity for which a data record is desired. This stock identification code is compared with stock identification codes stored on the drum and, at such time as a match is found, the appropriate data record is caused to be selected and read from the drum and to be applied to a retriever unit. Data records read from the drum by the retriever units in the above fashion are displayed at the display units of subscribers and used by the subscribers to provide a variety of services to its customers and to the public.

While the abovedescribed system operates in a generally satisfactory manner, the data handling and processing capabilities of the remote slave station are somewhat limited. Thus, for example, the writing apparatus used at the slave station to write data records and other types of information (e.g., stock identification and exchange identification codes) onto the storage drum is incapable at any given time of handling more than one writing operation for writing data records or other types of information onto the drum. In addition, data records can be obtained from the storage drum at the slave station only via a display unit such as employed at a subscriber's office. Consequently, if it is desired to obtain an up-to-date listing of data records stored on the drum, for example, to determine the correctness thereof, the above reading approach is very slow and very inefficient. In addition, it is not possible with the above reading approach to quickly and effectively obtain a variety of useful listings from the information stored on the drum, for example, listing of those securities or commodities which have achieved certain conditions such as new highs and/or lows, or separate listings, by exchange, of the various securities and commodities for which information is provided on the drum. An additional shortcoming of the above slave station is that it is not possible to obtain information from the drum by using binary addresses, representing the physical locations of information on the drum, instead of stock identification codes.

BRIEF SUMMARY OF THE INVENTION

Briefly, in accordance with the present invention, a data processing arrangement is provided for use in an information storage and retrieval "slave" which avoids the limitations of the aforedescribed prior art "slave" system. The data processing arrangement of the invention includes a requesting input means which is operable to produce request messages specifying particular types of operations desired to be performed. By way of example, these operations may include a variety of different types of read and write operations. A plurality of operation circuits are also provided which are assigned to and used in the execution of the particular types of operations (e.g., read and write operations) desired to be performed by the requesting input means and specified by request messages produced by the requesting input means. A first means adapted to receive request messages produced by the requesting input means operates in response to each request message to determine whether an operation circuit assigned to the type of operation specified by the request message is available or unavailable to be used in the execution of the type of operation specified by the request message. A second means operates in the event the first means determines that an operation circuit is available to be used in the execution of a particular type of operation specified by a request message to produce an acknowledge signal. A third means operates to receive and transfer the acknowledge signal produced by the second means to the requesting input means.

As will be apparent hereinafter, the abovementioned requesting input means may comprise a plurality of input devices each of which is capable of producing a request message specifying a particular type of operation desired thereby to be performed. In this case, a traffic controller means is employed to scan the input devices to detect request messages produced by the input devices. The traffic controller means is also used to transfer acknowledge signals back to the input devices.

BRIEF DESCRIPTION OF THE DRAWING

Various objects, features, and advantages of an information storage and retrieval system in accordance with the present invention will be apparent from the following detailed discussion with the accompanying drawing in which.

DETAILED DESCRIPTION OF THE INVENTION

Information Storage and Retrieval System

Figure 1:
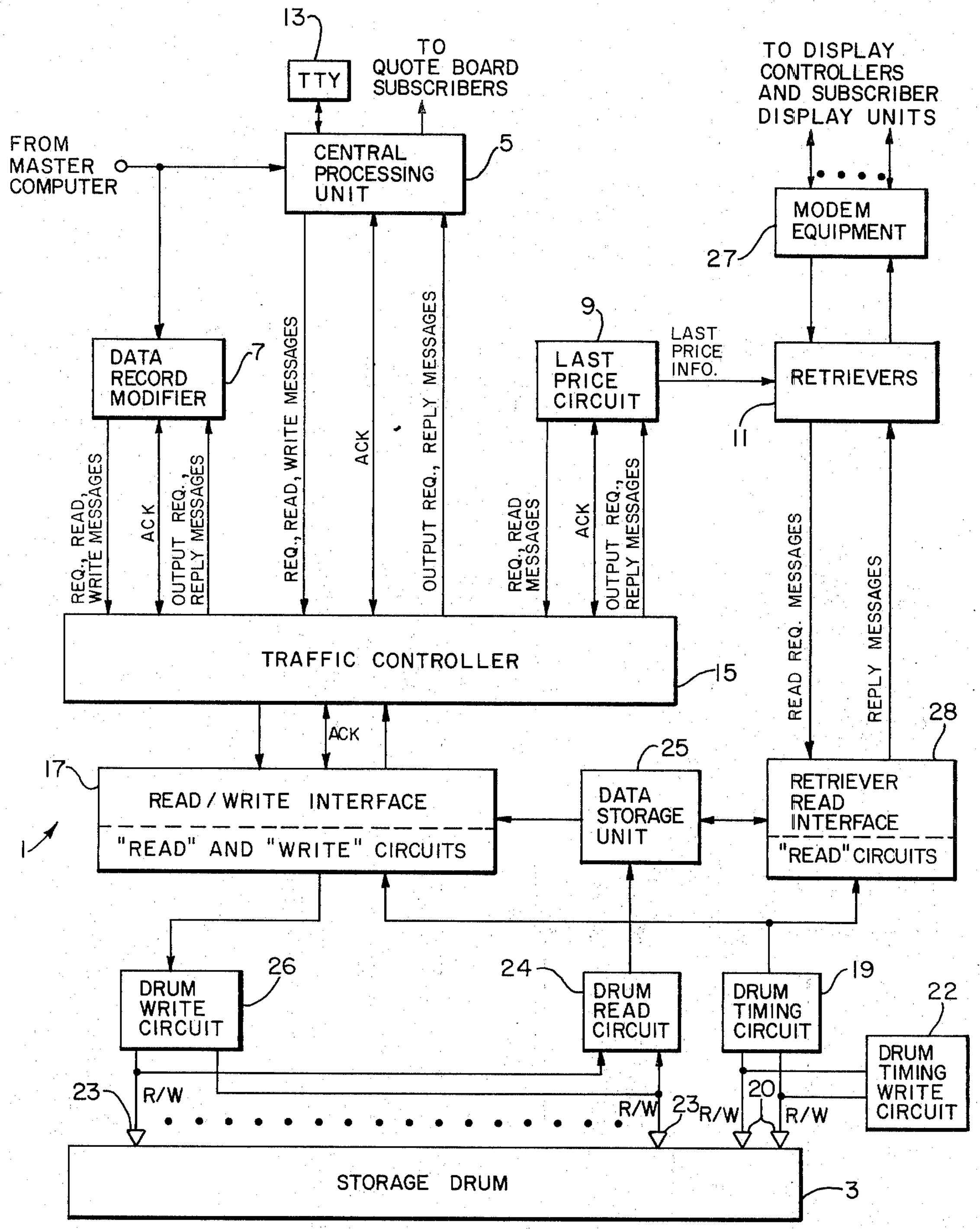
FIG. 1 is a schematic block diagram of an information storage and retrieval "slave" system in accordance with the invention.

General Description — FIG. 1

Referring now to FIG. 1, there is shown in functional block diagram form an information storage and retrieval "slave" system 1 in accordance with the present invention. The information storage and retrieval system 1 has general utility. However, it will be described herein in the context of a system for disseminating security and commodity information to the brokerage industry.

Figure 2:
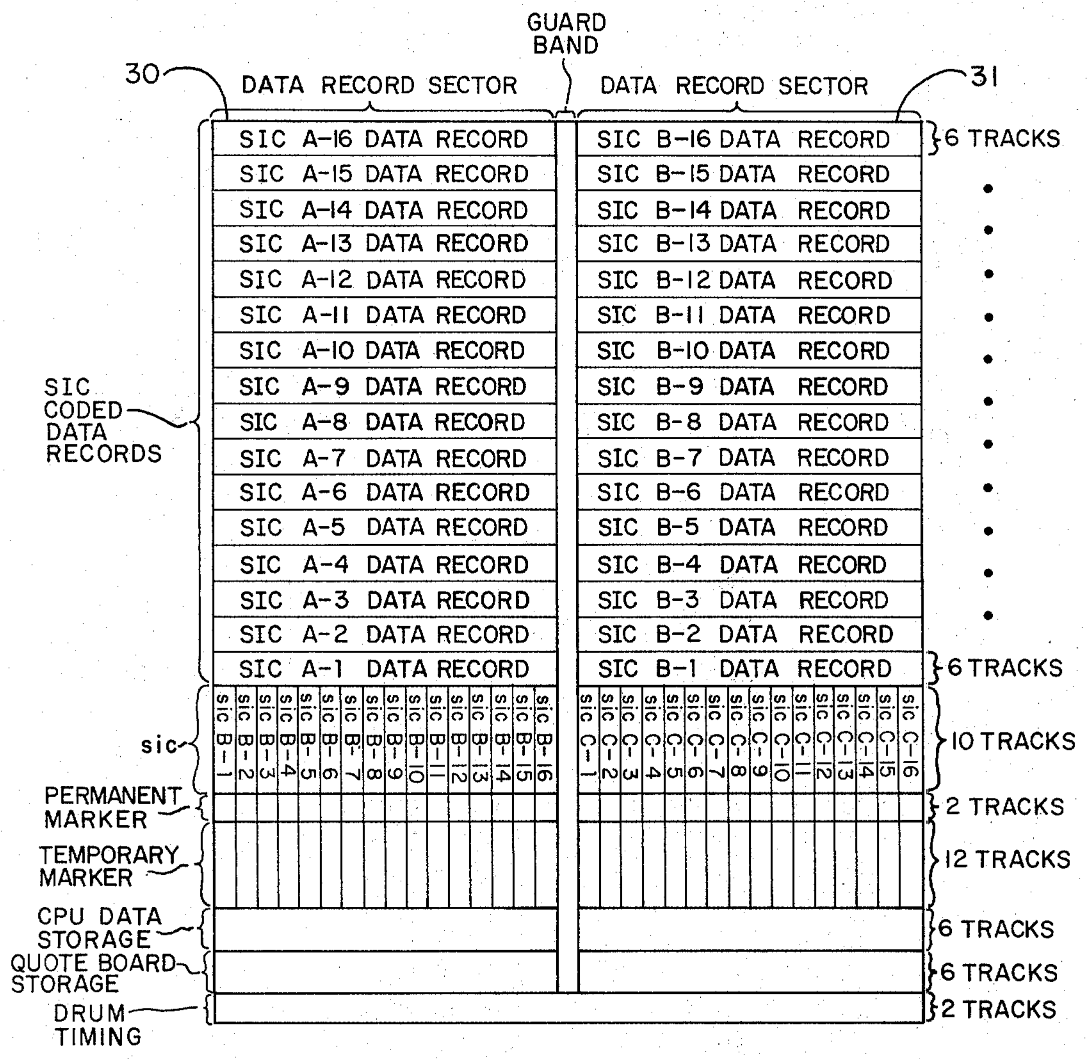
FIG. 2 illustrates the information content of a portion of a storage drum employed in the information storage and retrieval system of FIG. 1.

The information storage and retrieval system 1 includes a storage drum 3 on which information is stored to be used by a plurality of input devices including a central processing unit 5, a data record modifier 7, a last-price circuit 9, and a plurality of retrievers 11. The storage drum 3, to be described in detail hereinafter in connection with FIG. 2, is arranged to store information pertaining to securities and commodities traded on security and commodity exchanges in the United States and in Canada. The storage drum 3 is also arranged to store timing information for controlling read and write operations with respect to the storage drum 3, and other information, designated hereinafter as "CPU" information, to be used for special purposes by the central processing unit 5. The abovementioned information pertaining to the securities and commodities typically includes the following types or classes of information: information identifying the securities and commodities and the exchanges on which the securities and commodities are traded; security and commodity data records including security and commodity price information (e.g., last, bid, ask, open, high, low and closing prices) and statistical and transaction information (e.g., trading units, dividends, yield, earnings, price/earnings ratios, trading volume, last sale time, etc.); temporary information indicating that certain temporary conditions (e.g., high, low, or last sale prices) have been achieved by particular securities or commodities; and special security and commodity information, designated "quote board" information, to be used by the central processing unit 5 for assembling messages to be transmitted to subscribers to be displayed on electromechanical "quote boards" located on their premises.

The abovementioned information stored on the drum 3 is initially received by the information storage and retrieval system 1 to be stored on the storage drum 3 from a master computer (not shown) which receives raw ticker data from the various security and commodity exchanges and performs the necessary computational and processing operations on the raw ticker data to convert the data to the desired form for use by the information storage and retrieval system 1. The storage drum 3, as employed in the present invention, may be implemented by any suitable non-destructive read-out, random-access, bulk-storage drum memory.

The central processing unit 5, which may be a conventional general-purpose programmable computer, is employed to initiate a variety of write and read operations with respect to the storage drum 3. These operations of the central processing unit 5, which will be described in greater detail hereinafter, are under the control of software programs entered into the central processing unit 5 by means of a teletypewriter 13 coupled to the central processing unit 5. Alternatively, a card reader or a magnetic tape unit may be used instead of the teletypewriter 13. The various write operations initiated by the central processing unit 5 include the writing onto the storage drum 3 of the following types of information: security and commodity data records (alone or together with associated temporary condition information), quote board information, CPU information, and identification information identifying the securities and commodities and the exchanges on which the securities and commodities are traded. All of the above information, with the exception of the CPU information, is derived from the master computer. The read operations initiated by the central processing unit 5 include the reading from the drum 3 of the following types of information: security and commodity data records, quote board information, CPU information, and identification information identifying the securities and commodities and the exchanges on which the securities and commodities are traded. Information derived from the storage drum 3 as a result of the abovementioned read operations initiated by the central processing unit 5 are applied to the central processing unit 4 and then printed out by the teletypewriter 13. The printouts of the teletypwriter 13 may then be used to determine whether the system is functioning properly, that is, the information stored on the drum 3 is correct, and also to provide check lists and other lists of the different types of information stored on the drum 3. Quote board information read from the storage drum 3 is assembled by the central processing unit 5 into messages to be sent to quote board subscribers to be displayed on conventional electromechanical quote boards located on their premises.

The data record modifier 7 is employed in accordance with the present invention for the sole purpose of updating the security and commodity data records and the related temporary condition information stored on the storage drum 3. In the event of failure or malfunctioning of the data record modifier 7, the central processing unit 5 may be programmed to assume the operation of the data record modifier 7. The abovementioned updating of information is necessitated by the continuous changes which normally occur in the prices and other information pertaining to securities and commodities during the trading of these securities and commodities on the floors of the various exchanges. As the information pertaining to a particular security or commodity changes, the master computer supplies the new information to the data record modifier 7. The data record modifier 7 stores this information initially and then operates to modify first the temporary condition information stored on the storage drum 3 (to indicate that the security or commodity has achieved certain new conditions) and then to modify the corresponding data record to reflect the changes in the information content of the data record. The abovementioned modification of the information content of the data record is accomplished by first reading the data record to be modified from the storage drum 3, modifying the data record to reflect the changes in the information contained therein, and then re-applying the data record, as modified, back to the storage drum 3 to be stored thereon. The modified information on the storage drum 3 is then available to be used by the central processing unit 5 in the execution of its various programs and also to be used by the last-price circuit 9 and the retrievers 11 as will be described hereinafter. The data record modifier 7 may be implemented by circuitry well known to those skilled in the art.

The last-price circuit 9, as employed in the present invention, serves to obtain last-price security and commodity information from the drum 3, as maintained in a current state on the drum 3 by the data record modifier 7. This last-price information is then applied to the various retrievers 11. The manner in which this last-price information is employed by the retrievers 11 will also be described hereinafter. The last-price circuit 9 may also be implemented by circuitry well known to those skilled in the art.

The central processing unit 5, the data record modifier 7, and the last-price circuit 9 gain access to the storage drum 3 to either read information from the storage drum 3 or to write information onto the storage drum, as briefly described above, through a traffic controller 15. The traffic controller 15, which is typically a scanning and switching unit, operates to scan the three input devices 5, 7, and 9 in succession to detect active requests by the input devices to gain access to the storage drum 3 for the purpose of performing read or write operations with respect thereto. Upon detecting a request by one of the three input devices 5, 7 and 9, the traffic controller 15 stops at that input device and the input device then produces a request message identifying itself and the particular read or write operation which it wishes to perform. This request message is then switched by the traffic controller 15 to a read/write interface 17. The read/write interface 17, which will be described in detail hereinafter in connection with FIG. 3, includes a plurality of "read" and "write" circuits (also to be described in detail hereinafter) each of which is assigned to and used in the execution of a particular type of read or write operation desired to be performed by one of the three input devices. For example, at least one "read" circuit is assigned to each of the following types of read operations: reading data records from the storage drum 3; reading quote board information from the drum 3; reading CPU information from the drum 3; and reading security and commodity identity information and exchange identity information from the drum 3. Similarly, at least one "write" circuit is assigned to each of the following types of write operations: writing data records onto the drum 3; writing both data records and temporary condition information together onto the drum 3; writing quote board information onto the drum 3; writing CPU information onto the drum 3; and writing security and commodity identity information and exchange identity information onto the drum 3. As will be described in greater detail hereinafter, for some read and write operations, particularly operations for reading data records from the drum 3 or writing data records onto the drum 3, several "read" and "write" circuits are provided in the read/write interface 17 whereby several read and/or write operations are permitted to be processed essentially simultaneously.

In response to a read or write request message being transferred to the read/write interface 17, the status of each "read" or "write" circuit is examined to determine whether it is busy or not busy, that is, whether it is then being used to perform some other read or write operation to which it is assigned. This latter operation is accomplished by status-determining circuitry provided within the read/write interface 17 operating in conjunction with a drum timing circuit 19. The drum timing circuit 19 operates to receive timing information stored on the drum 3, via read/write timing heads 20, and to convert this timing information into binary address signals for use by the status-determining circuitry in addressing the "read" and "write" circuits to determine their availability for use in read and write operations. The drum timing circuit 19 will be described in greater detail hereinafter in connection with FIG. 3. The aforementioned timing information is written onto the storage drum 3 by means of a drum timing write circuit 22 of standard design.

In the event a particular "read" or "write" circuit is determined to be available for use in performing a particular read or write operation to which it is assigned, an acknowledge (ACK) signal is produced by the read/write interface 17 and transferred by the traffic controller 15 back to the particular input device 5, 7 or 9 requesting access to the storage drum 3. In response to this acknowledge signal, the requesting input device initiates an input read or write message for use by the read/write interface 17 in performing the desired read or write operation. This input read or write message is transferred to the read/write interface 17 by the traffic controller 15. In the case of a read operation, the input read message produced by the requesting input device identifies the input device and the desired read operation to be performed and also identifies the particular information desired to be read from the storage drum. In response to this latter message, the read/write interface 17 operates to load the portion of the message identifying the desired information into the aforementioned "read" circuit previously determined to be available. The read/write interface 17 then operates in conjunction with the drum timing circuit 19 to determine the location on the drum of the requested information. Once this determination has been made, the requested information is captured from the storage drum "on the fly" by means of read/write heads 23, and coupled via a drum read circuit 24, of standard design, to a data storage unit 25. As soon as the requested information is received by the data storage unit 25, which will also be described in greater detail hereinafter in connection with FIG. 3, it is stored therein. An output request message is then initiated by the read/write interface 17 to determine whether the requesting input device is ready to receive the information read from the drum. The output request message identifies the input device and the particular read operation earlier requested thereby. The output request message is detected by the traffic controller 15 and then transferred to the requesting input device. If the input device is ready to receive the information, that is, it is not busy performing some other operation, it operates in response to the output request message to produce an acknowledge signal (ACK) which is then coupled back to the read/write interface 17 by the traffic controller 15. The read/write interface 17 operates in response to the acknowledge signal to produce a reply message to be returned to the input device which includes, inter alia, the identity of the input device and the particular read operation it has requested and the information earlier read from the drum 3 and stored in the data storage unit 25. The reply message is coupled by the traffic controller 15 to the input device.

In the case of a write operation requested by the input device, the write message produced by the input device identifies the input device and the desired write operation to be performed and includes the data to be written onto the drum 3 and the location on the drum where the data is to be written. The read/write interface 17 operates in response to this input write message to load the portion of the message identifying the location on the drum where data is to be stored into the "write" circuit determined to be available to perform the operation requested by the input device. The read/write interface 17 then operates, in conjunction with the aforementioned drum timing circuit 19, to determine where the data in the input write message is to be written onto the drum 3. Once this determination is made, the data is applied by the read/write interface 17 to a drum write circuit 26. The drum write circuit 26, of a conventional design, then operates to convert the serial data into the necessary from to be written onto the appropriate parallel tracks of the drum. The aforementioned read/write heads 23 are used for this purpose. It is apparent from the above discussion, therefore, that in read operations two "handshaking" operations take place, one to establish a data communications path between one of the input devices and the storage drum 3 (to read data from the drum) and another to establish a data communications path between the storage drum 3 and the input device (to transfer data stored on the drum to the input device). In write operations, only the former "handshaking" operation is used.

The aforementioned retrievers 11, as employed in the present invention, serve to retrieve data records stored on the drum 3 to be displayed on display units (e.g., CRT video display terminals) located at remote locations, for example, in stock brokerage offices. No write operations are initiated or performed by the retrievers 11. Each retriever operates to poll, in succession, a plurality of display units (e.g., up to 32 display units) coupled to the retriever through an associated display controller and modem equipment 17. A read message initiated by a given display unit requesting a data record stored on the drum 3 is communicated to its corresponding retriever 11 via its associated display controller and the modem equipment 27. The retriever 11 then operates to transfer the read message to a retriever read interface 28. The retriever read interface 28, which will be described in greater detail hereinafter in connection with FIG. 5, includes, in a manner similar to the read/write interface 17, a plurality of "read" circuits which are assigned to and used in the execution of read operations. The status of each "read" circuit is ascertained by status-determining circuitry included in the retriever read interface 28 and also, as before, by the drum timing circuit 19. In the event a "read" circuit is available to perform a retriever read operation, that is, it is not busy, the requested data record is captured from the drum 3 "on the fly" via the read/write heads 23 and coupled by the drum read circuit 24 to the data storage unit 25. The data record is then transferred from the data storage unit 25 to the retriever read interface 28 and applied to the appropriate retriever 11. The data record is then combined with the last price information, derived from the drum by the last-price circuit 9 (and pertaining to the particular security or commodity for which the data record was read from the drum 3). The combined message is then transmitted to the requesting display unit, by means of the modem equipment 27 and the associated display controller, to be then displayed at the display unit. The data record and last-price information message from the retriever is also accompanied by a coded address for selecting the next display unit in the succession of display units associated with the retriever. The retrievers 11 may be implemented by circuitry well known to those skilled in the art.

Referring now to FIG. 2, there is shown a portion of the storage drum 3 on which the aforementioned security and commodity information, CPU information, and timing information is stored. The portion of the storage drum shown in FIG. 2 includes a first zone or sector 30 in which a first plurality of coded data records SIC A–1 to SIC A–16 are stored, and a second zone or sector 31 in which a second plurality of coded data records SIC B–1 to SIC B–16 are stored. The two sectors 30 and 31 are segregated from each other by means of a guard band located between the two sectors. Each of the coded data records SIC A–1 to SIC A–16 and SIC B–1 to SIC B–16 pertains to a different security or commodity and includes, in binary-coded form, up-to-date information relative to the security or commodity. By way of example, information relating to a security includes price information such as last, bid, ask, open, high, low and closing prices, and statistical and transaction information such as trading units, dividends, yield, earnings, price/earnings ratio, trading volume, last sale time, etc. Information relating to a commodity includes price information such as last, bid, ask, open, high, low and closing prices and transaction information such as volume. Typically, each of the coded data records is recorded on an area of the drum 3 which is six parallel tracks wide.

Each of the sectors 30 and 31 also includes an area several tracks wide on which coded information is stored identifying the securities or commodities for which SIC data records are provided in the next adjacent sector of the drum. Specifically, the sector 30 in FIG. 2 includes 10 parallel tracks, designated "sic" tracks, for storing stock identification codes sic B–1 to sic B–16 identifying the securities or commodities for which data records are provided in the adjacent sector 31. Similarly, the sector 31 in FIG. 2 includes 10 parallel "sic" tracks for storing stock identification codes sic C–1 to sic C–16 identifying the securities for which data records are provided in the next adjacent sector (not shown in FIG. 2). The reason for staggering the storage of stock identification codes relative to the corresponding coded data records will become fully apparent hereinafter from a detailed discussion of the operation of the read/write interface 17 and the drum timing circuit 19 of FIG. 3. Each stock identification code (sic) typically comprises several serially encoded characters, for example, up to four coded characters, each comprising five parallel bits. The characters of each stock identification code are recorded in succession on five of the 10 tracks provided for the storage of each stock identification code with the remaining five tracks being reserved for future expansion.

Each of the sectors 30 and 31 of the storage drum 3 further includes a pair of parallel tracks, designated "permanent marker" tracks. These tracks are used in each sector to store permanent marker codes, specifically, exchange identification codes, identifying the exchanges on which the various securities and commodities for which data records are provided in the next sector are traded. The exchange identification codes for each of the sectors 30 and 31 are stored on the permanent marker tracks adjacent to the 10 "sic" tracks on which the security identification codes are stored in the sector. Typically, each exchange identification code comprises eight bits, four bits being stored on each of the pair of permanent marker tracks.

Each of the sectors 30 and 31 of FIG. 2 also includes 12 parallel tracks, designated "temporary marker" tracks. These tracks are used in each sector to store temporary marker codes representing certain temporary conditions achieved by the securities for which data records are provided in the next sector. The temporary marker codes for each of the sectors 30 and 31 are stored on the temporary marker tracks adjacent the pair of permanent marker tracks on which the exchange identification codes are stored in the sector. Typically, each temporary marker code comprises 12 bits which are stored in parallel on the twelve temporary marker tracks. The temporary conditions represented by the temporary marker codes typically include such temporary price conditions as closing prices, close hundreds prices, open prices, last prices, open correction prices, highs, and lows.

In addition to the abovedescribed storage tracks, storage tracks are also provided in each of the sectors 30 and 31 for the storage of special information to be used solely by the central processing unit 5 and for the storage of quote board information to be used by quote board subscribers. Specifically, six parallel tracks, designated "CPU data storage" tracks, are provided in each of the sectors 30 and 31 adjacent to the 12 temporary marker tracks of the same sector. These tracks are used to store coded temporary bulk information such as off-line computer programs to be used solely by the central processing unit 5 in the execution of its programs. Six additional parallel tracks, designated "Quote board storage" tracks, are provided in each of the sectors 30 and 31 adjacent to the CPU data storage tracks of the same sector. These tracks are used to store coded security and commodity information to be assembled into messages by the central processing unit 5 for transmission to quote board subscribers. Typically, only one of the quote board storage tracks is sufficient for the above purpose with the remaining five tracks representing spare tracks.

The reading or writing of the abovedescribed information onto the various storage tracks of the drum 3 is controlled by timing information stored on the drum 3. This timing information is stored on the drum 3 on a pair of drum timing tracks provided at one edge of the drum 3 adjacent to the quote board storage tracks of each of the various sectors of the drum. FIG. 2 illustrates a portion of these timing tracks adjacent the quote board storage tracks of the sectors 30 and 31. One of the pair of drum timing tracks stores a continuous serial train of clock pulses, a selected number of which correspond to each of the sectors of the drum 3, and the other drum timing track stores timing information indicating the "beginning" (origin) of the drum 3 and the beginning of each sector of the drum. The purpose and use of the above timing information will be described in greater detail hereinafter.

A typical arrangement of the storage drum 3 includes 1,280 sectors, each of which is capable of storing 16 data records, 16 stock identification codes, 16 permanent marker codes and 16 temporary marker codes. This arrangement, therefore, is able to provide information on up to 20,480 (1,280 × 16) securities and commodities.

Figure 3:
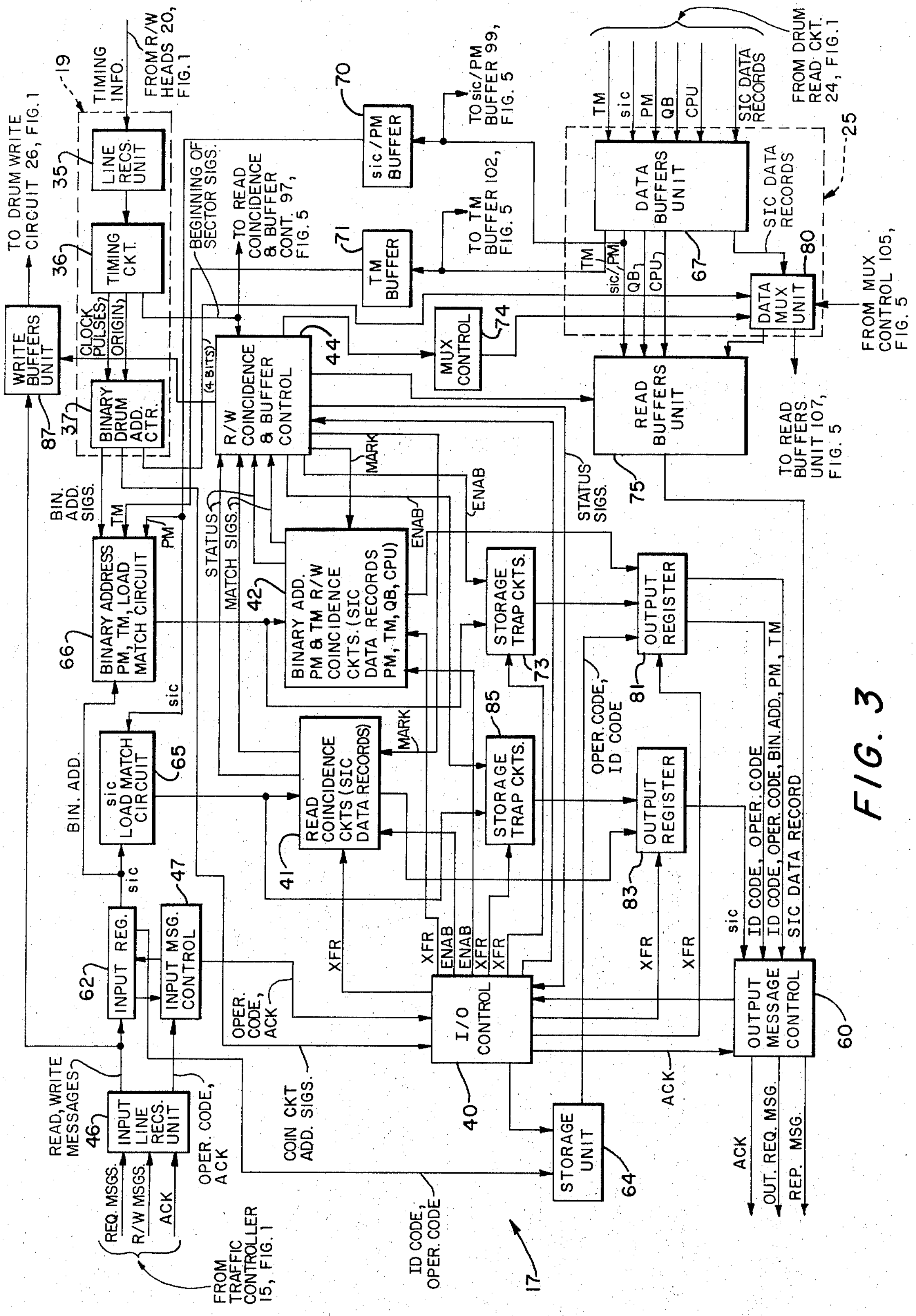
FIG. 3 is a schematic block diagram of a read/write interface employed in the information storage and retriever system of FIG. 1.

Referring now to FIG. 3, there is shown in detail the read/write interface 17, the drum timing circuit 19, and the data storage unit 25 in accordance with the present invention. As mentioned previously, the read/write interface 17 is employed in the execution of various read and write operations as requested by the central processing unit 5, the data record modifier 7, and the last-price circuit 9. The operation of the read/write interface 17 to cause data to be read from the storage drum 3 or to be written onto the drum 3 is under the control of the drum timing circuit 19.

As shown in FIG. 3, the drum timing circuit 19 includes a line receivers unit 35, a timing circuit 36, and a binary drum address counter 37. The line receivers unit 35, typically comprising isolation buffers, is connected to the read/write timing heads 20 and serves to receive timing information as read by the read/write timing heads 20 from the timing tracks provided on the storage drum 3. As stated previously, this timing information includes a train of serial clock pulses (stored on a first one of the pair of timing tracks), and other timing information indicating the beginning (origin) of the drum and the beginning of each sector of the drum (stored on the other one of the pair of timing tracks). The line receivers unit 35 operates to transfer the clock pulses and the other timing information to the timing circuit 36. The timing circuit 36 operates to transfer the clock pulses to the binary drum address counter 37 and also to detect the timing information received thereby indicating the origin of the drum and the beginning of each sector of the drum. This latter information is converted by the timing circuit 36 to control signals, designated in FIG. 3 as ORIGIN and BEGINNING OF SECTOR signals, respectively, and applied, respectively, to the binary drum address counter 37 and to a read/write coincidence and buffer control 44. The manner in which these signals are used by the binary drum address counter 37 and the read/write coincidence and buffer control 44 will be described in detail hereinafter.

The binary drum address counter 37 operates to cumulatively count, in a binary fashion, the clock pulses received from the timing circuit 36. As the binary drum address counter 37 counts the clock pulses corresponding to each of the drum sectors, it produces a binary address signal, typically comprising 11 bits, representing the binary address, or physical location, on the drum 3 of the drum sector. Moreover, as the binary drum address 37 cumulatively counts the clock pulses corresponding to each of the drum sectors, it produces successive binary address signals, typically comprising four bits, representing the binary addresses, or physical locations, on the drum of each of the data records stored in the sector. These latter binary address signals also represent the binary addresses, or physical locations, on the drum of the various stock identification codes, permanent marker (exchange identification) codes, and temporary marker (temporary condition) codes stored in the sector inasmuch as the same number of these codes (16) are stored in the sector as there are data records (16). Typically, the binary drum address counter 37 is a synchronous binary counter containing 15 stages, eleven stages of which provide 1,280 binary addresses, corresponding to the 1,280 sectors of the drum 3, and four stages of which provide 16 binary addresses, corresponding to the 16 data records, 16 stock identification codes, 16 permanent marker codes, and 16 temporary marker codes stored in each sector of the storage drum 3. The binary drum address counter 37 is reset prior to the beginning of the first sector of the storage drum 3, that is, each time that an ORIGIN signal is received thereby from the timing circuit 36. As will be described in detail hereinafter, the abovementioned binary address signals produced by the binary drum address counter 37 are employed to determine where information should be read from or written onto the storage drum 3.

In addition to the abovementioned binary address signals, the binary address counter 37 also produces other binary address signals, designated in FIG. 3 as "COINCIDENCE CIRCUIT ADDRESS" signals, which are applied in succession to an input/output control 40 provided in the read/write interface 17. Similar signals are also produced and applied by the binary drum address counter 37 to the retriever read interface 28, as will be described hereinafter. The input/output control 40 uses the abovementioned binary address signals to determine whether certain coincidence circuits 41 and 42, assigned to and used in the execution of specific read and write operations requested by the various input devices 5, 7 and 9, are available to perform those operations. The number of COINCIDENCE CIRCUIT ADDRESS signals required to perform the above availability determining operation is determined by the number of coincidence circuits 41 and 42. For example, for a typical total of 32 coincidence circuits 41 and 42, five stages (any five stages) of the binary drum address counter 37 may be used to provide 32 different COINCIDENCE CIRCUIT ADDRESS signals.

The aforementioned coincidence circuits 41 represent "read" coincidence circuits and are assigned to and used in the execution of read operations for reading data records stored on the storage drum 3. The coincidence circuits 42 represent "read/write" coincidence circuits and are assigned to and used in the execution of both read and write operations. Specifically, the coincidence circuits 42 are assigned to and used in the execution of read operations for reading data records, stock identification codes and associated permanent marker codes, temporary marker codes, quote board information, and CPU information from the storage drum 3 and also for writing the aforementioned classes or types of information onto the storage drum 3. A significant difference between the read coincidence circuits 41 and the read/write coincidence circuit 42 is that the read coincidence circuits 41 use stock identification codes in the execution of its operations (read) whereas the read/write coincidence circuits 42 use binary addresses in the execution of their operations (read and write operations). The abovementioned distinctions will become more readily apparent hereinafter from a discussion of the various read and write operations for which the coincidence circuits 41 and 42 are employed in the present invention.

Before a particular read or write operation requested by one of the input devices 5, 7, and 9 may be performed, it is necessary to determine whether one of the coincidence circuits 41 and 42 assigned to that operation is available for use. At any given time, any one or more of the coincidence circuits 41 and 42 may be busy performing read or write operations to which they are assigned or, alternatively, not busy, that is, available for use in performing the particular operations to which they are assigned. At such time as one of the input devices 5, 7 and 9 wishes to perform a particular read or write operation with respect to the storage drum 3, that is, to gain access to the storage drum 3 to perform a particular read or write operation, it must first be determined whether the coincidence circuit assigned to that operation is available for use. Thus, for example, if one of the input devices 5, 7 and 9 wishes to gain access to the storage drum 3 to read or write a particular data record or to read or write quote board information, a determination must first be made as to whether a coincidence circuit assigned to that operation is available for use. To initiate the above determination, the requesting input device 5, 7 or 9 produces a request message including a request signal and an operation code, in binary form, specifying the particular read or write operation which it wishes to execute. The request signal in the request message is detected by the traffic controller 15 (FIG. 1) and the request message is then transferred to an input line receivers unit 46 provided in the read/write interface 17. The input line receivers unit 46, typically comprising isolation buffers, operates to couple the request message to an input message control 47. The input message control 47 operates to detect the operation code in the request message and couples the operation code to the input/output control 40. At this time, the aforementioned read/write coincidence and buffer control 44, which is connected to each of the coincidence circuits 41 and 42, operates to monitor the status of each coincidence circuit. A first status signal is produced by the read/write coincidence and buffer control 44 for each coincidence circuit which is busy and a second status signal is produced by the read/write coincidence and buffer control 44 for each coincidence circuit which is not busy. The status signals produced by the read/write coincidence and buffer control 44 are coupled to the input/output control 40. The operation of the input/output control 40 at this point may best be understood from a discussion of FIG. 4 which illustrates in detail status-determining circuitry employed in the input/output control 40.

Figure 4:
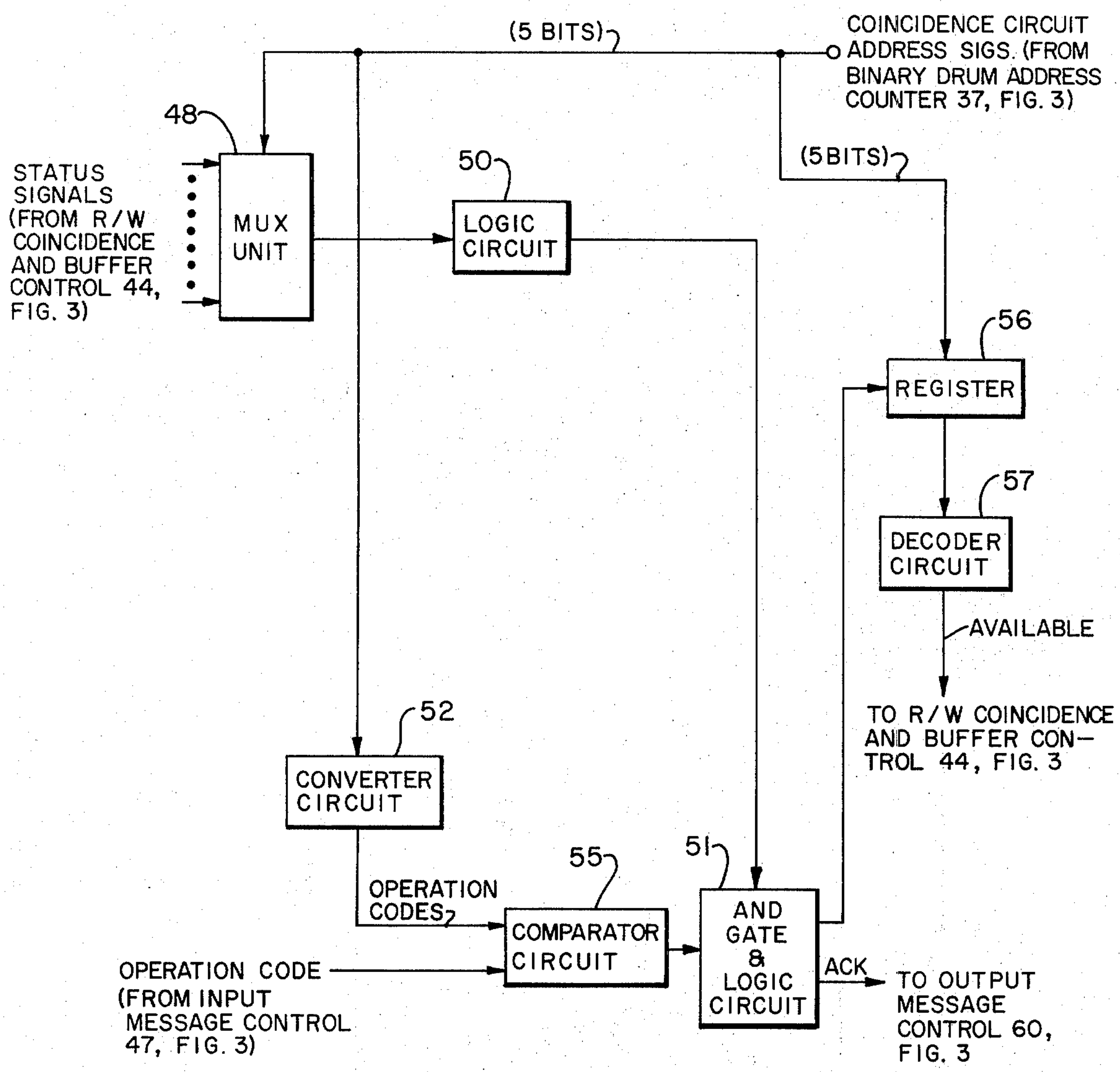
FIG. 4 is a schematic block diagram of status-determining circuitry employed in the read/write interface of FIG. 3 for determining the status of read and write circuits also employed in the read/write interface.

As shown in FIG. 4, the status signals produced by the read/write coincidence and buffer control 44 and also the aforementioned COINCIDENCE CIRCUIT ADDRESS signals produced in succession by the binary drum address counter 37 are applied to a multiplexer unit 48 provided in the status-determining circuitry shown in FIG. 4. The multiplexer unit 48 operates in response to the successive COINCIDENCE CIRCUIT ADDRESS signals, of which there are a total of 32, to successively multiplex the status signals corresponding to coincidence circuits 41 and 42, of which there are also a total of 32, to a logic circuit 50. The 32 different COINCIDENCE CIRCUIT ADDRESS signals therefore represent addresses for the 32 coincidence circuits 41 and 42. The logic circuit 50 operates to examine each of the status signals received thereby from the multiplexer unit 48 and to produce an output signal each time that a status signal is received thereby indicating that the corresponding coincidence circuit is not busy. If the status signal corresponding to a coincidence circuit indicates that the coincidence circuit is busy, no output signal is produced by the logic circuit 50. Each output signal produced by the logic circuit 50 indicating that a coincidence circuit is not busy is applied as a first input to an AND gate and logic circuit 51.

The COINCIDENCE CIRCUIT ADDRESS signals produced in succession by the binary drum address counter 37 are also applied to a converter circuit 52. These signals are converted by the converter circuit 52 into a plurality of successive operation codes, one corresponding to each of the coincidence circuits 41 and 42. It is to be noted that since several of the coincidence circuits are assigned to the same type of read or write operation, for example, data record reading or writing operations, in which case the input devices 5, 7 and 9 use the same operation code to initiate these operations, several of the COINCIDENCE CIRCUIT ADDRESS signals are converted by the converter circuit 52 to the same operation code. Each of the operation codes produced in succession by the converter circuit 52 is compared in a comparator circuit 55 with the operation code previously received from one of the input devices 5, 7 and 9 via the input message control 47 and specifying the type of read or write operation desired to be performed by the input device. At such time as a match is found between the operation code received from the input message control 47 and one of the operation codes produced by the converter circuit 52 and corresponding to one of the coincidence circuits, an output signal is produced by the comparator circuit 55 and applied as a second input of the AND gate and logic circuit 51. Whenever the AND gate and logic circuit 51 receives two input signals coincident in time, one from the logic circuit 50 indicating that a particular coincidence circuit is not busy and one from the comparator circuit 55 indicating that the coincidence circuit is of the correct type to perform the particular read or write operation specified by the operation code received from the input message control 47, an output control signal is produced thereby and applied to a register 56 and, in addition, an acknowledge (ACK) signal is produced thereby. The register 56 is enabled by the output control signal produced by the AND gate and logic circuit 51 to receive and store therein the binary address of the coincidence circuit determined to be available to perform the operation specified by the operation code in the request message from the requesting input device. This binary address is then decoded by a decoder circuit 57 to provide an output signal representing this circuit. This output signal, designated in FIG. 4 as an "AVAILABLE" signal, is applied by the decoder circuit 57 to the read/write coincidence and buffer control 44 which then operates to "mark" the selected coincidence circuit. The manner in which the "marked" coincidence circuit is subsequently used will be described in detail hereinafter in connection with a discussion of the various read and write operations initiated by the input devices 5, 7 and 9.

The aforementioned acknowledge (ACK) signal produced by the AND gate and logic circuit 51 is transferred to an output message control 60 (FIG. 3) and then applied thereby to the traffic controller 15 (FIG. 1). The traffic controller 15 detects the acknowledge signal and transfers it to the particular one of the input devices 5, 7 and 9 initiating the request to perform a read or write operation. The requesting input device is thereby informed that a coincidence circuit is ready and able to be used to perform the requested read or write operation.

As mentioned previously, the central processing unit 5, the data record modifier 7, and the last-price circuit 9 are capable of initiating a variety of read and write operations. These read and write operations are briefly summarized hereinbelow. The input devices 5, 7 and 9 which are capable of initiating the read and write operations are also indicated hereinbelow.

a. Reading a data record from the drum 3 by means of a stock identification code (sic)—central processing unit 5, data record modifier 7;

b. Reading a data record from the drum 3 by means of a binary address code—central processing unit 5;

c. Reading a data record from the drum 3 by means of a permanent marker code—central processing unit 5;

d. Reading a data record from the drum 3 by means of a temporary marker code—central processing unit 5, last-price circuit 9;

e. Reading quote board information from the drum 3—central processing unit 5;

f. Reading CPU (central processing unit) information from the drum 3—central processing unit 5;

g. Block reading of stock identification codes and their associated permanent marker codes (sic/PM) from the drum 3—central processing unit 5;

h. Writing a data record onto the drum 3 (by means of a binary address)—central processing unit 5, data record modifier 7;

i. Writing a data record and an associated temporary marker code together on the drum 3 (by means of a binary address)—central processing unit 5, data record modifier 7;

j. Writing quote board information onto the drum 3 (by means of a binary address)—central processing unit 5;

k. Writing CPU (central processing unit) information onto the drum 3 (by means of a binary address)—central processing unit 5; and l. Block writing stock identification codes and their associated permanent marker codes (sic/PM) onto the drum 3 (by means of a binary address)—central processing unit 5.

The above operations will now be described in detail. It will be assumed in the following discussion that the necessary operations have been performed, in the general manner described hereinbefore, to determine the availability of coincidence circuits to perform their associated read or write operations, and that acknowledge (ACK) signals have been produced and transferred to the appropriate ones of the input devices 5, 7 and 9.

a. Reading a data record from the drum 3 by means of a stock identification code (sic)

Data records are read from the storage drum 3 by means of stock identification codes by the central processing unit 5 and by the data record modifier 7. The central processing unit 5 typically initiates operations to read data records from the drum 3 for the purpose of replacing these data records with new data records received from the master computer and also for deriving compilations of data records to be printed out by the teletypewriter 13. The data record modifier 7 initiates operations to read data records from the drum 3 for the purpose, mentioned hereinbefore, of modifying the data records to reflect changes in the information content of the data records.

To read a data record from the storage drum 3 by means of a stock identification code (sic), the requesting input device (in this case, the central processing unit 5 or the data record modifier 7) initiates an input read message which is then transferred by the traffic controller 15 to the input line receivers unit 46 of the read/write interface 17. This message includes a device identification code identifying the requesting input device, an operation code identifying the particular read operation to be performed (that is, a "read-by-sic" operation), and a stock identification code identifying the security or commodity for which a data record is desired. In response to receiving the input read message produced by the requesting input device, the input line receivers unit 46 operates to couple the operation code contained in the message to the input message control 47. The input message control 47 decodes the operation code and then clocks an input register 62 to receive and store therein the entire input read message. The input message control 47 detects the storage of the input read message in the input register 62 and then operates to transfer the stock identification code portion of the input read message from the input register 62 into an sic load match circuit 65. The input message control 47 also operates at this time to transfer the operation code and device identification code portions of the read message from the input register 62 to a storage unit 64. The storage unit 64 is selected to be of the non-destructive readout type. The purpose of the aforementioned transfer will become apparent hereinafter.

Once the stock identification code has been transferred into the sic load match circuit 65, the input message control 47 produces and applies an output signal to the input/output control 40 indicating that this transfer has taken place. The input/output control 40 then enables the read coincidence circuits 41, and the stock identification code in the sic load match circuit 65 is applied in common to all of the read coincidence circuits 41. However, only the particular one of the read coincidence circuits 41 which was previously "marked" or selected, by the read/write coincidence and buffer control 44 (during processing of the request message), receives therein the stock identification code from the sic load match circuit 65. The marked read coincidence circuit 41, by virtue of its receiving the stock identification code from the load match circuit 65, is thereby prepared to perform comparison operations between the stock identification code of the input read message and the various stock identification codes stored on the storage drum 3.

It is to be noted at this juncture that as the stock identification code stored in the input register 62 is transferred into the sic load match circuit 65, as described above, it is also transferred into a binary address, PM and TM load match circuit 66. However, since no coincidence circuits 42 are provided for performing comparison operations with stock identification codes, the stock identification code in the load match circuit 66 is not loaded into one of the coincidence circuits 42. As will be described in detail hereinafter, the load match circuit 66 and the coincidence circuits 42 are employed in the system to perform binary address, permanent marker code, and temporary marker code comparison operations during the execution of specific read and write operations, all of these operations requiring the use of binary addresses as part of the input messages received by the input line receivers unit 46.

The stock identification codes stored on the storage drum 3 which are to be compared with the stock identification code loaded into the marked read coincidence circuit 41 are applied in succession to a data buffers unit 67 via the appropriate ones of the read/write heads 23 and the drum read circuit 24. The data buffers unit 67 contains a plurality of data buffers arranged to receive and temporarily store therein the various classes of information stored on the different tracks of the drum 3, namely, the stock identification codes, the permanent marker (exchange identification) codes, the temporary marker codes, the coded SIC data records, the coded quote board information, and the coded CPU (central processing unit) information. As the various stock identification codes derived from the storage drum 3 are applied to the data buffers unit 67, the corresponding permanent marker codes and temporary marker codes are also applied to the data buffers unit 67 via their associated read/write heads 23 and the drum read circuit 24. The stock identification codes and the permanent marker codes are applied in succession via their associated data buffers to an sic/PM buffer 70 and stored in succession therein. The temporary marker codes are applied in succession by their associated data buffer to a TM buffer 71 and stored in succession therein. The stock identification codes stored in the sic/PM buffer 70 are applied in succession to the sic load match circuit 65. The permanent marker codes stored in the sic/PM buffer 70 are applied in succession to the binary address, PM and TM load match circuit 66. The temporary marker codes stored in the TM buffer 71 are also applied in succession to the binary address, PM and TM load match circuit 66. The binary address, PM and TM load match circuit 66 further receives coded binary drum address signal (15 bits) produced in succession by the binary drum address counter 37 and representing the binary addresses of the various stock identification codes and the associated permanent and temporary marker codes stored in each sector of the drum and also the binary addresses of the various coded data records stored in each sector of the drum.

Each of the stock identification codes applied to the sic load match circuit 65 from the sic/PM buffer 70 is applied to the aforementioned marked read coincidence circuit 41 and compared therein with the stock identification code which was earlier placed therein after being extracted from the input read message stored in the input register 62. At such time as a match is found between the stock identification code derived from the read message and a stock identification code derived from the storage drum 3, an output "match" signal is produced by the marked read coincidence circuit 41 and applied to the read/write coincidence and buffer control 44. The read/write coincidence and buffer control 44 operates in response to this signal to enable selected ones of a plurality of storage trap circuits 73 assigned to operate in conjunction with the marked read coincidence circuit 41. These selected storage trap circuits are operated to receive and "trap" therein the following information: the permanent marker and temporary marker codes received by the load match circuit 66 and corresponding to the matching stock identification code from the drum 3; and the binary address signal received by the load match circuit 66 from the binary drum address counter 37 and representing the binary address, (or physical location on the drum 3) of the matching stock identification code and its associated permanent and temporary marker codes and also the binary address of the SIC data record corresponding to the matching stock identification code. For reasons to be apparent hereinafter, the storage trap circuits 73 are selected to be of the non-destructive readout type. As will be described hereinafter, the information stored in the storage trap circuits 73 is employed in the formation of an outgoing reply message to be returned to the requesting input device.

At such time as the abovementioned sic match is found and the appropriate information has been transferred from the load match circuit 66 to the appropriate ones of the storage trap circuits 73, the coded SIC data record corresponding to the matching stock identification code is next located. This data record is found on the drum 3 in the sector of the drum next following the sector in which the matching stock identification code is located, in the manner previously indicated, for example, in FIG. 2. To locate the data record, the read/write coincidence and buffer control 44 operates to produce and apply an output signal to a multiplexer control 74 at such time as the sic match is found. The multiplexer control 74 operates in response to this output signal to control one of a plurality of data multiplexers provided in a data multiplexer unit 80 to receive and store therein four bits (4 bits out of 15 bits) from the binary drum address counter 37 representing the physical location of the data record in the next sector of the drum corresponding to the matching stock identification code. At the beginning of the sector next following the sector in which the matching stock identification code was located, the timing circuit 36 produces and applies a BEGINNING OF SECTOR signal to the read/write coincidence buffer control 44. The read/write coincidence and buffer control 44 operates in response to this signal to produce an output signal to condition a read buffers unit 75 to receive and store therein the data record read from the drum, specifically, from six parallel tracks, and corresponding to the matching stock identification code. This data record is received by the data multiplexers unit 80 from the data buffers unit 67, together with the other data records in the same sector of the drum. The desired data record is selected from the several data records by the data multiplexer in the data multiplexer unit 80 which was previously enabled by the four bits from the binary drum address counter 37 identifying the location of the data record within its sector of the drum. Typically, the read buffers unit 75 includes a plurality of recirculating read data buffers arranged to receive individual data records read from the drum and also other classes of information derived from the drum, specifically, stock identification codes and their associated permanent marker codes, coded quote board information, and coded CPU (central processing unit) information. The particular read data buffer to be selected, or conditioned, by the read/write coincidence and buffer control 44 to receive information derived from the drum 3 (in response to a BEGINNING OF SECTOR signal) is determined by the type of match condition established in one of the coincidence circuits 41 and 42, that is, whether there is a match of stock identification codes, binary addresses, etc. In the present example, with a match of stock identification codes in one of the read coincidence circuits 41, only the read data buffer which is arranged to receive data records is selected to receive a data record (the desired data record) from the drum 3. It is apparent therefore, from the above discussion, that the staggering of data records on the drum relative to the corresponding stock identification codes eliminates the need for reversing the direction of rotation of the drum to locate a data record once the corresponding stock identification code has been found, an operation which would otherwise have to be performed if data records and their corresponding stock identification codes were to be stored in the same sector of the drum.

After the desired data record corresponding to the abovedescribed matching stock identification code has been received and stored in the appropriate one of the read data buffers in the read buffers unit 75, an output request message is assembled from various information present in the read/write interface 17 and transmitted to the requesting input device (either the central processing unit 5 or the data record modifier 7) to determine whether it is ready to receive a reply message. This operation is performed in the following manner.

After the data record corresponding to the matching stock identification code has been stored in the appropriate read data buffer in the read buffers unit 75, this condition is detected by the input/output control 40 by monitoring the status of the read/write coincidence and buffer control 44. The input/output control 40 then operates to control the storage unit 64 to cause the operation code and the device identification code stored therein to be non-destructively read out therefrom and to be applied to a first output register 81. At the same time, the input/output control 40 operates to control the read coincidence circuit 41 in which the match between the stock identification code from the input read message and the stock identification code from the drum 3 took place to cause the stock identification code therein to be transferred to a second output register 83. The input/output control 40 also operates to control the storage trap circuits 73 to cause the binary address signal, the permanent marker code, and the temporary marker code stored therein to be non-destructively read out and transferred to the first output register 81. Once the abovementioned information has been loaded into the two output registers 81 and 83, the output request message may be initiated by the input/output control 40. Specifically, the input/output control 40 causes the device identification code and the operation code in the output register 81 to be extracted therefrom and to be applied to the output message control 60. The operation code and the device identification code are then combined in the output message control 60 with a request signal to form a request message. The request signal in the message is detected by the traffic controller 15 whereupon the request message is transferred by the traffic controller 15 to the requesting input device.

Assuming for the present that the requesting input device is ready to receive a reply message, an acknowledge (ACK) signal is produced thereby and transferred by the traffic controller 15 to the input line receivers unit 46. This acknowledge signal is coupled by the input line receivers unit 46 to the input message control 47 which, in turn, couples the acknowledge signal to the input/output control 40. At this time, the input/output control 40 causes the operation code and the device identification code stored in the output register 81 and the binary address signal, the permanent marker code, and the temporary marker code stored in the output register 81 to be applied to the output message control 60 to be assembled therein to form the first word of a reply message. The input/output control 40 then causes the stock identification code stored in the output register 83 to be applied to the output message control 60 to be used therein to form the second word of the reply message. Finally, the input/output control 40 causes the read/write coincidence and buffer control 44 to enable the data read buffer (within the read buffers unit 75) containing the desired data record to transfer the data record therein (comprising data from six parallel tracks) to the output message control 60. The six tracks of data are assembled in the output message control 60 to form the third through eighth words of the reply message. The eight words of the reply message, as assembled above, are then transmitted by the output message control 60 to the requesting input device via the traffic controller 15. A significant aspect of the invention is that all of the information comprising the reply message is obtained from the drum 3 during the time of one revolution of the drum. Thus, several successive read operations are not required to obtain the information from the drum 3. After the transmission of the reply message has been completed by the output message control 60, the output message control 60 signals the input/output control 40 that this operation has been completed. The input/output control 40 then controls the read coincidence circuit 41 just used, via the read/write coincidence and buffer control 44, to change its status from "not available" back to "available."

In the event during the abovedescribed operation of the read/write interface 17 the requesting input device is not ready or prepared to receive a reply message, as manifested by its failure to return an acknowledge (ACK) signal to the input line receivers unit 46, the read/write interface 17 and, more specifically, the input/output control 40, must wait to transmit the reply message until the requesting input device is ready to receive the reply message. In this case, the input/output control 40 periodically examines the read coincidence circuit providing the match and causes new output request messages to be assembled from the operation code and device identification code stored (non-destructively) in the storage unit 64. At such time as an acknowledge (ACK) signal is received from the requesting input device (via the traffic controller 15), the input/output control 40 operates, in conjunction with the read/write coincidence and buffer control 44, to once again cause the information contained in the read coincidence circuit 41 and the information contained (non-destructively) in the selected storage trap circuits 73 to be applied to the output registers 81 and 83, respectively, and to cause the data record in the read buffers unit 75, which data record is in a continuously recirculating state, to be transferred to the output message control 60. The output message control 60 then assembles the necessary reply message in the manner previously described.

Between successive request messages initiated by the input/output control 40 to obtain an acknowledge signal from the requesting input device, the input/output control 40 is free to determine whether reply messages should be assembled in response to other read messages from other ones of the input devices. This aspect of the invention will be described in greater detail hereinafter.

b. Reading a data record from the drum 3 by means of a binary address

A data record stored on the storage drum 3 may also be read from the drum by means of a binary address identifying the location on the drum where the data record is stored. This type of read operation is generally employed by the central processing unit 5 following a "read-by-sic" operation and serves as a check on that operation. As will become apparent shortly, the actual operation for reading a data record from the drum by using a binary address is similar in many respects to the operation for reading a data record from the drum by using a stock identification code.

To read a data record from the drum 3 by means of a binary address, an input read message is produced by the requesting input device (the central processing unit 5) which includes a device identification code identifying the requesting input device (that is, the central processing unit 5), an operation code specifying the particular read operation to be performed, that is, a "read-by-binary address" operation, and a binary address (15 bits) identifying the location on the drum of the desired data record. As in the case of a read-by-sic operation, this message is applied to and stored in the input register 62 of the read/write interface 17. The operation code and the device identification code in the input read message are then caused to be applied to and non-destructively stored in the storage unit 64. The binary address in the input read message is applied to the binary address, PM and TM load match circuit 66 and then compared in a previously marked one of the coincidence circuits 42 with binary addresses (15 bits) produced by the binary drum address counter 37 and representing the locations on the drum 3 of the various data records stored thereon. (The binary address in the input read message is also applied to the sic load match circuit 65 but no read coincidence circuits 41 are provided for comparing stock identification codes derived from the drum with the binary address.)

As soon as a match is obtained between the binary address of the input read message and one of the binary addresses produced by the binary drum address counter 37, the stock identification code corresponding to the matching binary address, which is applied to the sic load match circuit 65 via the appropriate data buffer in the data buffers unit 67 and the sic/PM buffer 70, is caused to be "trapped" (by the read/write coincidence and buffer control 44) in a selected one of a plurality of storage trap circuits 85. At the same time, the permanent marker and temporary marker codes corresponding to the matching binary address, both of which are applied to the load match circuit 66 via the appropriate data buffers in the data buffers unit 67 and the buffers 70 and 71, are caused to be trapped in selected ones of the storage trap circuits 73. At the beginning of the next sector following the sector in which the binary address match was found, the desired data record from that next sector is selected by four bits (4 bits out of 15 bits) from the binary drum address counter 37 (applied to one of the data multiplexers in the data multiplexer unit 80) and applied to and stored in a corresponding assigned one of the read data buffers in the read buffers unit 75. An output request message is then assembled by the input/output control 40 and the output message control 60 from the operation code and the device identification code stored in the storage unit 64 and, after an acknowledge signal is received back from the requesting input device (the central processing unit 5), an outgoing reply message is assembled to be sent to the requesting input device. This reply message is formed in essentially the same manner as described with respect to a read-by-sic operation. Specifically, the operation code and the device identification code stored in the storage unit 64 are caused to be transferred by the input/output control 40 to the output register 81, the matching binary address contained in the marked coincidence circuit 42 is caused to be transferred to the output register 81, the permanent and temporary marker codes trapped in the storage trap circuits 73 are caused to be transferred to the output register 81, and the stock identification code trapped in the storage trap circuit 85 is caused to be transferred to the output register 83. The information stored in the output registers 81 and 83 is then assembled by the output message control 60 into an outgoing reply message. This message comprises: a first word including the device identification code, the operation code, the binary address identifying the desired data record, and the permanent marker and temporary marker codes; a second word including the stock identification code corresponding to the desired data record; and third through eighth words representing the six tracks of data of the data record. It is apparent therefore, that the reply message assembled in the present case is identical to the reply message assembled during the aforedescribed read-by-sic operation.

c. Reading a data record on the drum 3 by means of a permanent marker code

A data record stored on the storage drum 3 may also be read from the drum 3 by means of a permanent marker code. As described previously, permanent marker codes are used to represent the identity of an exchange on which certain securities or commodities are traded and for which data records are desired. This type of operation is generally employed by the central processing unit 5 to obtain compilations of data records for all of the securities or commodities traded on each of several different exchanges.

To obtain a data record from the storage drum using a permanent marker code, an input read message is produced by the central processing unit 5 which includes a device identification code identifying the requesting input device (that is, the central processing unit 5), an operation code specifying the particular read operation to be performed, that is, a "read-by-PM" operation, a so-called "start" binary address, and a permanent marker code identifying the particular exchange on which a security or commodity for which a data record is desired is traded. The abovementioned "start" binary address, typically comprising 15 bits, represents a starting point for the present "read-by-PM" operation and represents the location of the last data record read from the drum using a read-by-PM operation. Typically, read-by-PM operations are performed starting with the beginning or origin of the drum the binary address of which is known. This binary address is used as the first start address for a read-by-PM operation. As successive read-by-PM operations take place, using the initial binary address as the first start address, and as each operation yields a binary address identifying the location on the drum of the data record of a particular security or commodity traded on the specified exchange, this binary address is used as a start address for the next operation. The manner in which a typical read-by-PM operation takes place will now be described.

As in the previous examples, the input read message produced by the central processing unit 5 is applied to and stored in the input register 62 of the read/write interface 17. The device identification code and the operation code are caused to be applied to and stored non-destructively in the storage unit 64, also as before, and the start binary address and the permanent marker code are applied to the binary address, PM and TM load match circuit 66. (The start binary address and the permanent marker code are also applied to the sic load match circuit 65 but no read coincidence circuits 41 are provided for comparing stock identification codes from the drum with the binary address and the permanent marker code). The start binary address and the permanent marker code applied to the load match circuit 66 are loaded into a corresponding previously-marked one of the coincidence circuits 42. The start binary address is then compared in the coincidence circuit 42 with the various binary addresses (15 bits) produced by the binary drum address counter 37 and representing the locations on the drum 3 of the various data records stored thereon. At such time as a match is found between the start binary address and one of the binary addresses produced by the binary drum address counter 37, this match condition is detected by the read/write coincidence and buffer control 44 and the coincidence circuit 42 is thereupon enabled to permit comparison operations to take place therein between the permanent marker code of the input read message and permanent marker codes derived from the drum (coupled to the coincidence circuit via the sic/PM buffer 70).

As soon as a match is obtained between the permanent marker code of the input read message and a permanent marker code derived from the drum 3, the stock identification code corresponding to the matching permanent marker code derived from the drum, which is applied to the sic load match circuit 65 via the sic/PM buffer 70, is caused to be trapped (by the read/-write coincidence and buffer control 44) in a selected one of the storage trap circuits 85. At the same time, the temporary marker code corresponding to the matching permanent marker code derived from the drum, which is applied to the load match circuit 66 via the TM buffer 71, is caused to be trapped in a selected one of the storage trap circuits 73. At the beginning of the next sector following the sector in which the permanent code match was found, the desired data record from that next sector is selected, as before, by four bits from the binary drum address counter 37 (applied to one of the data multiplexers in the data multiplexer unit 80), and then applied to and stored in a corresponding assigned one of the read data buffers in the read buffers unit 75.

An output request message is then assembled by the input/output control 40 and by the output message control 60 from the device identification code and the operation code stored (non-destructively) in the storage unit 64 and, after an acknowledge signal is received back from the requesting input device (the central processing unit 5), an outgoing reply message is assembled to be sent to the requesting input device. This reply message is formed in essentially the same manner as described with respect to the previous operation. Specifically, the operation code and the device identification code stored in the storage unit 64 are caused to be transferred therefrom (by the input/output control 40) to the output register 81, the matching binary address and the permanent marker code contained in the marked coincidence circuit 42 are caused to be transferred to the output register 81, the temporary marker code trapped in the storage trap circuit is caused to be transferred to the output register 81, and the stock identification code trapped in the storage trap circuit 85 is caused to be transferred to the output register 83. The information stored in the output registers 81 and 83 is then assembled by the output message control 60 into an outgoing reply message. This message comprises: a first word including the device identification code, the operation code, the binary address identifying the location on the drum of the desired data record, the permanent marker and temporary marker codes; a second word including the stock identification code corresponding to the desired data record; and third through eighth words representing the six tracks of data of the data record. Again, it is apparent that the reply message assembled in the present case is identical to the reply messages assembled during the aforedescribed operations.

d. Reading a data record from the drum 3 by means a temporary marker code

A data record stored on the storage drum 3 may also be read from the drum by means of a temporary marker code. This type of operation is commonly employed by the central processing unit 5 to obtain compilations of data records of securities and commodities which have achieved particular temporary conditions, for example, a high, low, or last price. This type of operation is also employed by the last-price circuit 9, as mentioned hereinbefore, to obtain last-price information relating to each security and commodity for which a data record is provided on the drum, this last-price information being assembled into messages to be transmitted to subscriber display units, as also previously mentioned.

To obtain a data record from the storage drum using a temporary marker code, an input message is produced by the requesting input device (either the central processing unit 5 or the last-price circuit 9) which includes a device identification code identifying the requesting input device, an operation code specifying the particular read operation to be performed, that is, a "read-by-TM" operation, a "start" binary address, and a temporary marker code specifying the particular condition of the security or commodity for which a data record is desired. Typically, one of the 12 bits of the temporary marker code is made a binary "one" to represent the particular condition of the security or commodity for which a data record is desired. In the case of a read-by-TM operation initiated by the last-price circuit 9, the temporary marker code specifies the last-price information of the security or commodity. As with a "read-by-PM" operation, the start binary address in the read-by-TM message represents the location of the last data record read from the drum using a read-by-TM operation.

The operation of the read/write interface 17 to process the above input read message is essentially the same as described hereinbefore with respect to the read-by-PM operation. The two types of operations differ from each other principally in that comparisons between permanent marker codes are made in the read-by-PM operation and the temporary marker code is trapped in one of the storage trap circuits 73, whereas comparisons between temporary marker codes are made in the read-by-TM operation and the permanent marker code is trapped in one of the storage trap circuits 73. A further difference is that only one binary "one" bit of a temporary marker code stored on the drum need match with the "one" bit in the temporary marker code of the input message to establish a matching condition in the selected coincidence circuit. The reply message produced in the read-by-TM operation is the same as that produced in the read-by-TM operation (and the previously-described operations).

e. Reading quote board information from the drum 3

As mentioned previously, quote board information stored on the drum 3 is employed by the central processing unit 5 in assembling messages to be transmitted to quote board subscribers. To read quote board information from the storage drum 3, an input read message is produced by the requesting input device (the central processing unit 5) which includes a device identification code identifying the requesting input device, an operation code specifying the particular operation to be performed, that is, a "quote board read" operation, and a binary address representing the location of a particular sector of the drum from which it is desired to obtain quote board information. The binary address of the message differs from the binary addresses of previous messages in that it contains only 11 bits, this number being adequate to represent the address or location of a sector of the drum in which quote board information is stored. The input read message, as in the previous examples, is caused to be entered into and stored in the input register 62 of the read/write interface 17. Also, as before, the device identification code and the operation code are caused to be entered into and stored (non-destructively) in the storage unit 64. The binary address in the input read message is initially applied to the binary address, PM and TM load match circuit 66 and compared in a previously marked one of the coincidence circuits 42 with the 11 most significant bits of the binary addresses (15 bits) produced by the binary drum address counter 37 and representing the locations on the drum of the various sectors.

At such time as a match is found between the binary address of the read input message and the 11 most significant bits of a binary address produced by the binary drum address counter 37, an output signal is produced by the read/write coincidence and buffer control 44 and applied to the read buffers unit 75. The quote board information from the drum 3 is applied at this time via the appropriate data buffer in the data buffers unit 67 to the assigned corresponding one of the read data buffers in the read buffers unit 75. After the quote board information has been stored in the read buffers unit 75, the input/output control 40 and the output message control 60 operate to assemble and transmit an output request message to the requesting input device (the central processing unit 5), using, as before, the device identification code and operation code stored in the storage unit 64. At such time as an acknowledge (ACK) signal is received back from the requesting input device, a reply message is assembled by the input/output control 40 and the output message control 60 and transmitted back to the requesting input device. Specifically, the input/output control 40 causes the device identification code and the operation code to be applied to and stored in the output register 81 and causes the binary address (11 bits) contained in the marked coincidence circuit 42 to also be applied to and stored in the output register 81. It is to be noted that no stock identification code, permanent marker code, or temporary marker code is caused to be applied to either of the output registers 81 and 83. This is due to the fact that no storage trap circuits 73 or 85 are provided to store this information during quote board read operations. Similarly no data record is caused to be applied to the read buffers unit 75, as was the case in the previous examples, inasmuch as no output signal is produced and applied to the multiplexer control 74 by the read/write coincidence and buffer control 44 when a "quote board" matching condition is achieved. The multiplexer control 74 and the data multiplexer unit 80 are therefore not used during quote board read operations.

To assemble the reply message, the input/output control 40 causes the device identification code, the operation code, and the binary address (11 bits) stored in the output register 81 to be applied to the output message control 60. This information is formed by the output message control 60 into the first word of the reply message. The input/output control 40 then operates, in conjunction with the read/write coincidence and buffer control 44, to cause the quote board information stored in the read buffers unit 75 to be applied to the output message control 60. This quote board information, representing information stored on one quote board track of the storage drum 3, is formed by the output message control 60 into the second, and last, word of the message. This reply message is then transmitted by the output message control 60 to the requesting input device.

f. Reading CPU (central processing unit) information from the drum 3

As mentioned previously, CPU information stored on the drum 3 represents special information, such as bulk-storage off-line computer programs, which is to be used solely by the central processing unit 5 in the performance of its various operations. To read CPU information from the storage drum, an input read message is produced by the central processing unit 5 which includes a device identifying code identifying the requesting input device, an operation code specifying the particular operation to be performed, that is, a "CPU read" operation, and a binary address representing the location of a particular sector of the drum from which it is desired to read the CPU information. As in the previous example, the binary address in the message comprises 11 bits. The input read message, as in the previous examples, is caused to be entered into and stored in the input register 62 of the read/write interface 17. Also, as before, the device identification code and the operating code are caused to be entered into and stored (non-destructivey) in the storage unit 64. The binary address in the input read message is applied to the binary address, PM and TM load match circuit 66 and compared in a previously marked one of the coincidence circuits 42 with the 11 most significant bits of the binary addresses (15 bits) produced by the binary drum address counter 37 and representing the locations on the drum of the various sectors.

At such time as a match is found between the binary address of the read input message and the 11 most significant bits of a binary address (15 bits) produced by the binary drum address counter 37, an output signal is produced by the read/write coincidence and buffer control 44 and applied to the read buffers unit 75. The CPU information from the drum 3 is applied at this time via the assigned corresponding data buffer in the data buffers unit 67 to the appropriate one of the read data buffers in the read buffers unit 75. As with the aforedescribed "quote board read" operation, no permanent marker code or temporary marker code is caused to be trapped and no data record is read from the drum 3 and applied to the read buffers unit 75. After the CPU information has been stored in the read buffers unit 75, the input/output control 40 and the output message control 60 operate to assemble and transmit an output request message to the requesting input device (the central processing unit 5), using, as before, the device identification code and operation code stored in the storage unit 64. At such time as an acknowledge (ACK) signal is received back from the requesting input device, a reply message is assembled by the input/output control 40 and the output message control 60 and transmitted back to the requesting input device. The reply message is assembled in the same manner as in the previous example. However, the reply message assembled in the present example differs from the reply message assembled in the previous example in that it contains seven words, the first word being the same as the first word of the reply message in the previous example and the second through seventh words representing the six tracks of CPU information stored on the drum.

g. Block reading of stock identification codes and associated permanent marker codes (sic/PM) from the drum 3

Stock identification codes and associated permanent marker codes (sic/PM) stored in a given sector of the drum may be read therefrom in block form. This type of operation is commonly employed by the central processing unit 5 in updating the information content of the drum, specifically, to add new data records and/or to drop existing data records from the drum, in which case it is necessary to write new stock identification codes and associated permanent marker codes onto the drum or to drop existing stock identification codes and their associated permanent marker codes from the drum.

To read a block of stock identification codes and associated permenent marker codes (sic/PM codes) from a given sector of the drum 3, an output read message is produced by the central processing unit 5 which includes a device identification code identifying the requesting input device, an operation code specifying the particular operation to be performed, that is, an "sic/PM block read" operation, and a binary address representing the location of the particular sector of the drum from which it is desired to obtain the block of sic/PM codes. The binary address contains 11 bits. The input read message, as in the previous examples, is caused to be entered into and stored in the input register 62 of the read/write interface 17. Also, as before, the device identification code and the operation code are caused to be entered into and stored (non-destructively) in the storage unit 64. The binary address in the input read message is applied to the binary address, PM and TM load match circuit 66 and then compared in a previously marked one of the coincidence circuits 42 with the 11 most significant bits of the binary addresses (15 bits) produced by the binary drum address counter 37 and representing the locations on the drum of the various sectors.

At such time as a match is found between the binary address of the read input message and the 11 most significant bits of a binary address produced by the binary drum address counter 37, an output signal is produced by the read/write coincidence and buffer control 44 and applied to the read buffers unit 75. The block of sic/PM codes from the drum 3 is applied at this time via the appropriate data buffer in the data buffers unit 67 to the assigned corresponding one of the read data buffers in the read buffers unit 75. As in "quote board read" and "CPU read" operations, no permanent marker code or temporary marker code is caused to be trapped and no data record is read from the drum and applied to the read buffers unit 75. After the block of sic/PM codes has been stored in the read buffers unit 75, the input/output control 40 and the output message control 60 operate to assemble and transmit an output request message to the requesting input device (the central processing unit 5), using, as before, the device identification code and operation code stored in the storage unit 64. At such time as an acknowledge (ACK) signal is received back from the requesting input device, a reply message is assembled by the input/output control 40 and the output message control 60 and transmitted back to the requesting input device. The reply message is assembled in the same manner as in "quote board read" and "CPU read" operations. However, the reply message assembled in the present case differs from the reply message assembled in the "quote board read" and "CPU read" operations in that it contains 13 words. The first word is the same as the first word of the "quote board read" and "CPU read" reply messages and the second through 13th words represent the 12 tracks of sic/PM codes stored on the drum.

h. Writing a data record onto the drum 3 (by means of a binary address)

To write a data record onto the storage drum 3, as with all write operations, a binary address is used. In the present case, the binary address represents the location at which the data record is to be written. This type of write operation is commonly employed by the central processing unit 5 to write new data records on the drum as they are received from the master computer and/or to replace data records previously read from the drum. The central processing unit 5 also uses this type of operation for the initial storing of all data records on the drum, that is, before initial use of the system. This type or write operation is also employed by the record modifier 7 to write data records, as previously modified thereby, back onto the drum.

To write a data record onto the drum 3, an input write message is produced by the requesting input device (in this case, either the central processing unit 5 or the data record modifier 7) which includes a device identification code identifying the requesting input device, an operation code specifying the particular operation to be performed, that is, a "data record write" operation, a binary address (15 bits) representing the location on the drum where the data record is to be written, and six words representing the coded data record to be stored on six selected tracks of the drum. This message is transferred by the traffic controller 15 to the input line receivers unit 46 of the read/write interface 17. In a manner similar to the aforedescribed read operations, the operation code in the input write message is coupled by the input line receivers unit 46 to the input message control 47. The input message control 47 decodes the operation code and then clocks the input register 62 to receive and store therein the entire input write message as received by the input line receivers unit 46. Also, at this time, the six words of the input write message representing the coded data record to be stored on six selected tracks of the drum are applied to the input of a write buffers unit 87. The write buffers unit 87 typically contains a plurality of recirculating write data buffers which are arranged to store each of the different classes of information to be stored on the drum 3, that is, SIC data records, stock identification codes, permanent marker codes, temporary marker codes, quote board information, and CPU information. The write buffers unit 87 further includes selection circuitry for selecting a particular one of the data write buffers to receive and store therein data to be written onto the drum and for selecting particular output connections to which the data words comprising data records are to be applied to be written onto selected tracks of the drum.

After the aforementioned six words of the input message have been applied to the input of the data buffers unit 87, the input message control 47 operates to transfer the binary address of the input write message in the input register 62 into the binary address, PM and TM load match circuit 66. At the same time, the input message control 47 signals the input/output control 40 that the latter operation has been completed and the input/output control 40 thereupon operates to signal the read/write coincidence and buffer 44 that a data record writing operation is to take place. The read/write coincidence and buffer control 44 then operates to produce an address signal for addressing the write buffers unit 87 to enable a particular data write buffer therein to receive and store the six words of the data record to be stored on the drum. The particular data write buffer in the write buffers unit 87 to be used is selected by an address signal produced by the read-write coincidence and buffer control 44 and representing the address of a write coincidence circuit previously determined to be available for use in data record write operations. Thus, a data write buffer corresponding to this coincidence circuit is selected.

Once the binary address of the input write message has been transferred into the load match circuit 66, it is then transferred into a previously marked one of the coincidence circuits 42 and compared therein with binary addresses (15 bits) produced by the binary drum address counter 37 and representing the various six-track SIC data record storage locations on the storage drum 3. At such time as a match is found between the binary address of the input write message and one of the binary addresses produced by the binary drum address counter 37, an output "match" signal is produced by the coincidence circuit 42 and applied to the read/write coincidence and buffer control 44. The read/write coincidence and buffer control 44 then operates in response to the "match" output signal produced by the coincidence circuit to select the four least significant bits of the binary address present in the "matching" coincidence circuit, representing the location on the drum of the six tracks on which the data record of the input message is to be stored, and applies these four bits to the write buffers unit 87. The write buffers unit 87 operates in response to the four bits to select the particular set of output connections thereof to receive the six data words of the data words to be written onto the desired set of tracks on the drum. At the beginning of the next sector following the sector in which the binary address match was obtained, a BEGINNING OF SECTOR signal is applied to the read/write coincidence and buffer control 44 by the timing circuit 36. The read/write coincidence and buffer control 44 operates in response to this signal to cause the six coded data words present in the write data buffer in the write buffers unit 87 to be applied to the drum write circuit 26. The drum write circuit 26 then operates to write the six coded data words on the appropriate set of six tracks on the drum.

i. Writing both a data record and a temporary marker code together onto the drum 3 (using a binary address)

A data record and a corresponding temporary marker code may also be written onto the storage drum 3 as part of a single write sequence. This type of operation is commonly employed by the central processing unit 5 to conserve time in writing information onto the storage drum 3. This type of operation is also commonly employed by the data record modifier 7 to write modified data records and modified temporary marker codes back onto the drum.

To write both a data record and a temporary marker code on the drum, the requesting input device (in this case, either the central processing unit 5 or the data record modifier 7) produces an input write message including a device identification code identifying the requesting input device, an operation code specifying the particular operation to be performed, that is, a "data record and temporary marker code write" operation, a temporary marker code to be written on the drum, and a binary address (15 bits) representing both the address of the location on the drum where the temporary marker code is to be written and where the six data words (SIC data record) are to be written. The operation of the read/write interface 17 to process the above input write message is essentially the same as that described hereinbefore for writing a data record alone on the drum. However, in the present write operation both the temporary marker and the six data words are caused to be loaded into appropriate ones of the write data buffers in the write buffers unit 87. At such time as a match is obtained in a previously marked coincidence circuit between the binary address in the input write message and a binary address (15 bits) produced by the binary drum address counter 37, the temporary marker code is applied immediately to the drum write circuit 26 and written onto the drum on the appropriate temporary marker tracks. At the beginning of the next sector of the drum following the sector in which the binary match condition was found, the six data words stored in one of the write data buffers in the write buffers unit 87 is written onto the appropriate set of six tracks of the drum, as specified by the four bits derived from the write coincidence circuit in which the match was derived.

j. Writing quote board information onto the drum 3 (using a binary address)

Quote board information, to be used by quote board subscribers, is caused to be written onto quote board tracks of the various sectors of the storage drum 3 by the central processing unit 5. To write quote board information onto the quote board tracks of a particular sector, an input write message is produced by the central processing unit 5 including a device identification code identifying the central processing unit 5, an operation code specifying the particular operation to be performed, that is, a "quote board write" operation, coded quote board information (one word) to be written onto the drum 3, and a binary address (11 bits) representing the sector on the drum on which the quote board information is to be written. As in the previous examples of writing operations, the binary address of the input write message is caused to be loaded through the load match circuit 66 into a previously marked one of the coincidence circuits 42 and to be compared therein with the 11 most significant bits of each of the binary addresses (15 bits) produced by the binary drum address counter 37 and representing the addresses of the various sectors of the drum. As in the previous example, the quote board information is applied to and stored, under control of the read/write coincidence and buffer control 44, in a selected one of the data write buffers in the write buffers unit 87. At such time as a match is obtained between the binary address of the input write message and the 11 most significant bits of a binary address produced by the binary drum address counter 37, an output signal is produced by the matching coincidence circuit and applied to the read/write coincidence and buffer control 44. At the beginning of the next sector following the sector in which the binary address match was found, the quote board information is caused to be applied to the drum write circuit 26 by the read/write coincidence and buffer control 44 to be written onto the quote board tracks of the selected sector of the drum.

k. Writing CPU (central processing unit) information onto the drum 3 (using a binary address)

CPU (central processing unit) information (e.g., offline computer programs) is caused to be written onto the drum 3 by the central processing unit 5. To write CPU information onto the CPU storage tracks of a particular sector of the storage drum 3, the central processing unit 5 produces a message including a device identification code identifying the central processing unit 5, an operation code specifying the particular operation to be performed, that is, a "CPU information write" operation, coded CPU information to be written onto a particular sector of the drum, and a binary address (11 bits) representing the location of the sector of the drum in which the CPU information is to be written. The operation of the read/write interface 17 to process the above message is essentially the same as that for writing quote board information onto the drum 3. Thus, as soon as a match is found in a previously marked one of the coincidence circuits 42 between the binary address in the input write message and the 11 most significant bits of a binary address (15 bits) produced by the binary drum address counter 37, an output signal is produced by the coincidence circuit and applied to the read/write coincidence and buffer control 44. At the beginning of the next sector following the sector in which the binary address match is found, the CPU information is caused to be applied to the drum write circuit 26 by the read/write coincidence and buffer control 44 to be written onto the CPU storage tracks of the selected sector of the drum.

1. Block writing of stock identification codes and associated permanent marker codes (sic/PM codes) onto the drum 3 (using a binary address)

Blocks of stock identification codes and their associated permanent marker codes (sic/PM) are caused to be written onto the drum 3 by the central processing unit 5. Typically, this type of operation is performed by the central processing unit 5 to write new stock identification codes and associated permanent marker codes onto the drum 3 and/or to replace existing stock identification codes and their associated permanent marker codes stored on the drum. To write a block of sic/PM codes onto the appropriate stock identification code tracks and permanent marker codes tracks of the storage drum 3, the central processing unit 5 produces a message including a device identification code identifying the central processing unit 5, an operation code specifying the particular operation to be performed, that is, an "sic/PM block write" operation, a block of sic/PM codes to be written onto the drum, and a binary address (11 bits) representing the location of the sector of the drum on which the block of sic/PM codes is to be written. The operation of the read/write interface 17 to process the above input write message is essentially the same as that for writing quote board information or CPU information onto the drum 3. Thus, as soon as a match is found in a previously marked one of the coincidence circuits 42 between the binary address in the input write message and the 11 most significant bits of a binary address (15 bits) produced by the binary drum address counter 37, an output signal is produced by the coincidence circuit and applied to the read/write coincidence and buffer control 44. At the beginning of the next sector following the sector in which the binary address match is found, the block of sic/PM codes is caused to be applied from the previously selected one of the data write buffers in the write buffers unit 87 to the drum write circuit 26. The block of sic/PM codes is then written by the drum write circuit 26 onto the selected sector of the drum 3 on the tracks used therein to store sic/PM codes.

Simultaneous Processing of Messages

As mentioned previously, at such time as the read/write interface 17 has obtained data from the storage drum 3 to be returned to a requesting input device 5, 7, or 9 in the form of a reply message, an output request message is produced by the read/write interface 17 to first determine whether the requesting input device is ready to receive the reply message. If the requesting input device is ready to receive the reply message, an acknowledge (ACK) signal is produced thereby and returned to the read/write interface 17. The read/write interface 17 then sends the reply message to the requesting input device. However, in the event the requesting input device is not ready to receive the reply message, as evidenced by its failure to return an acknowledge (ACK) signal to the read/write interface 17, the read/write interface 17 operates to determine whether other reply messages, in response to other read operations, should be returned to other ones of the requesting input devices. In this connection, it is to be noted that the read/write interface 17 is capable of processing several input read and write messages essentially simultaneously. Specifically, at such time as a stock identification code or a binary address in an input read message from an input device has been loaded into one of the coincidence circuits 41 and 42 and, in addition, the device identification code and the operation code of the message have been transferred to the storage unit 64, as described hereinbefore, the traffic controller 15 is able to switch to another input device and to transfer a new input message, either an input read message or an input write message, to the read/write interface 17 to be processed thereby simultaneously with the previous message. Thus, it is possible for several "read" and "write" matching operations to take place simultaneously in the coincidence circuits 41 and 42. In addition, since several input read and write operations may be processed in the read/write interface 17 simultaneously, the storage unit 64 is arranged to store simultaneously the device identification codes and operation codes of several such messages, for example, up to thirty two messages (representing the number of coincidence circuits).

At such time as a matching condition is established in one of the coincidence circuits 41 and 42, data is either read from or written onto the storage drum 3, in the manner earlier described in detail. In those cases where several reply messages are required to be returned to the input devices 5, 7, and 9, as a result of several input read messages being processed by the read/write interface 17 simultaneously, data read from the drum 3 is stored in the read buffers unit 75 and caused to recirculate therein until the input devices requesting this data are ready to receive the data. To this end, the coincidence circuits 41 and 42 are examined in sequence by the input/output control 40 and the read/write coincidence and buffer control 44 to detect "read" match conditions, and a request message is sent to the appropriate requesting input device after examining each coincidence circuit in which a read match condition is present. As mentioned hereinabove, in the event the requesting input device is ready to receive a reply message, an acknowledge (ACK) signal is produced by the input device and returned to the read/write interface 17 whereupon the reply message, including the requested data in the read buffers unit 75, is assembled and sent to the input device. In the event the requesting input device is not ready to receive a reply message, the input/output control 40 operates to examine another coincidence circuit to determine whether a "read" match condition exists. If such a condition exists, an output request message is sent to the appropriate input device. If that input device is ready to receive a reply message, a reply message including the data requested by the input device and then present in the read buffers unit 75, is sent to the input device. It is to be noted that no data to be sent to an input device in a reply message is ever lost or destroyed inasmuch as the storage unit 64 and the storage trap circuits 73 and 85 are non-destructive read out devices and, in addition, data applied to the read buffers unit 75 is able to recirculate continuously therein.

After all of the coincidence circuits have been examined by the input/output control 40 and by the read/write coincidence and buffer control 44, and appropriate request and reply messages have been produced and sent to the input devices, the input/output control 40 and the read/write coincidence and buffer control 44 then operate to initiate a new cycle of operations to examine the coincidence circuits once again to detect matching conditions and to produce reply messages to be sent to the input devices. The above types of operations continue until the input devices are able to receive data requested thereby.

The aforedescribed multiplexer control 74 and the data multiplexer unit 80 provided in the read/write interface 17 are also arranged to accommodate several simultaneous operations, specifically, several simultaneous read operations. Thus, for example, the multiplexer control 74 is arranged to control the data multiplexer unit 80 to receive up to four different sets of four bits from the binary drum address counter 37 to enable up to four data records to be retrieved at any given time from any one sector of the storage drum 3 and to be coupled by the data multiplexer unit 80 to the read buffers unit 75. Typically, the data multiplexer unit 80 comprises four data multiplexers. The read buffers unit 75 typically includes a separate read data buffer for storing each of the four data records coupled thereto by the data multiplexer unit 80.

Figure 5:
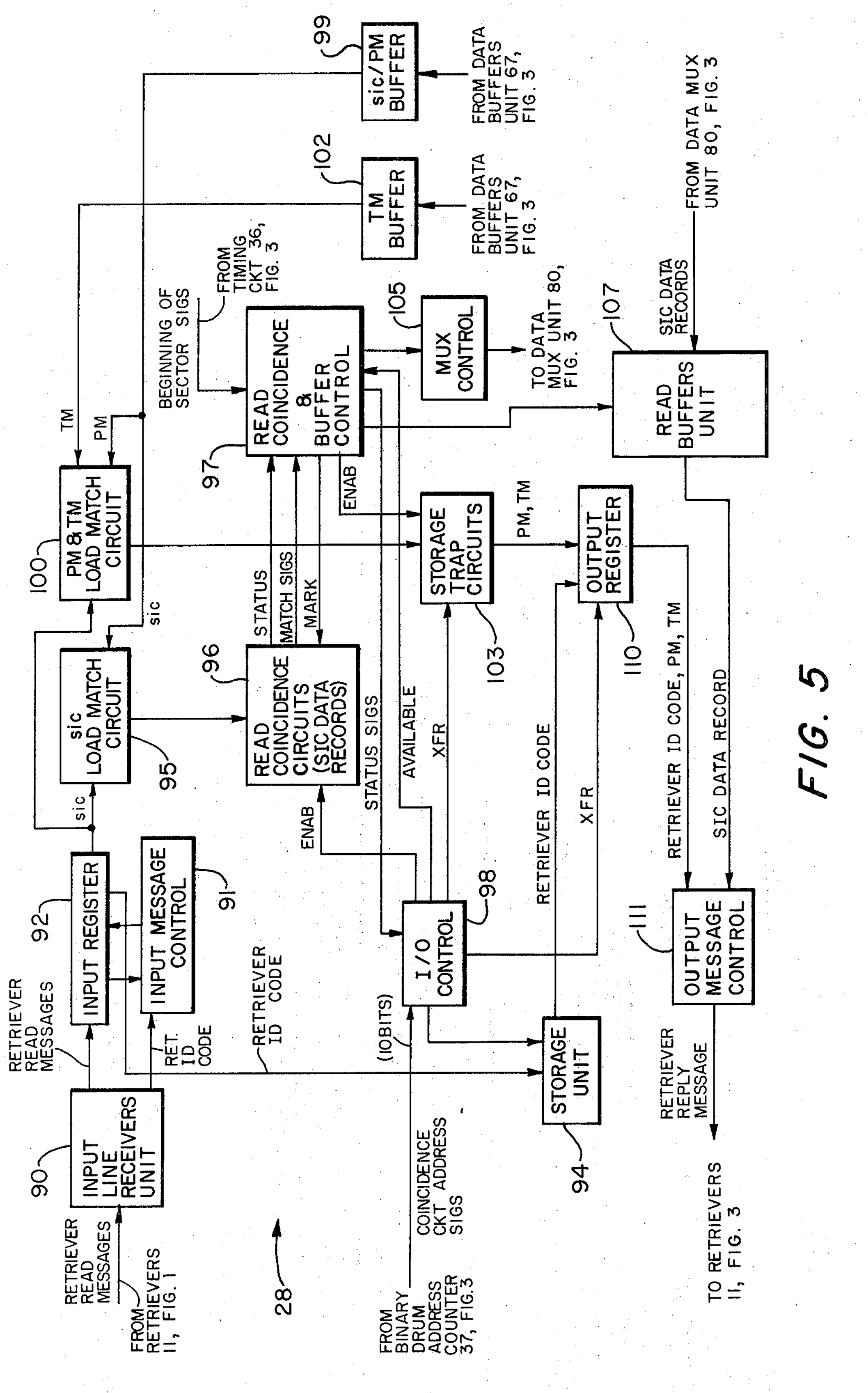
FIG. 5 is a schematic block diagram of a retriever read interface employed in the information storage and retrieval system of FIG. 1.

Retriever Read Interface 28 — FIG. 5

Referring now to FIG. 5, there is shown in detail the retriever read interface 28 in accordance with the invention. The retriever read interface 28 is similar to the read/write interface 17 but does not perform writing operations or "handshaking" operations. Thus, there are no "write" coincidence circuits, write data buffers, "write" controls, or use of acknowledge (ACK) signals or output request messages, or use of binary addresses for determining where data should be read from or written onto the drum. Data records are read from the drum solely by use of stock identification codes. Other differences between the retriever read interface 28 and the read/write interface 17 will become apparent from the following discussion of the retriever read interface 28.

The retriever read interface 28 includes an input line receivers unit 90 which receives input read messages from the retrievers 11 (FIG. 1) and couples each such message, under the control of an input message control 91, into an input register 92. A typical input read message received from one of the retrievers 11 includes a retriever identification code identifying the retriever and a stock identification code identifying the security or commodity for which a data record is desired. The retriever identification code is coupled by the input line receivers unit 90 into the input message control 91 and detected by the input message control 91 to control the loading of the message into the input register 92. When the above message is present in the input register 92, the retriever identification code in the message is transferred by the input message control 91 to a storage unit 94, and the stock identification code in the message is applied to an sic load match circuit 95. The stock identification code is then loaded into one of a plurality of read coincidence circuits 96 to be compared therein with stock identification codes derived from the storage drum 3. The particular one of the read coincidence circuits 96 into which the stock identification code is loaded is determined by a read coincidence and buffer control 97 which examines the coincidence circuits and produces output status signals representing the status of these circuits and also by an input/output control 98. The input/output control 98 receives COINCIDENCE CIRCUIT ADDRESS signals from the binary drum address counter 37 (FIG. 3) and uses these signals to examine in succession the status signals produced by the read coincidence and buffer control 97 to determine whether the corresponding coincidence circuits are in use or not in use. By way of example, for a typical total of 192 read coincidence circuits 96, a corresponding number of COINCIDENCE CIRCUIT ADDRESS signals may be derived from the binary drum address counter 37 by using the outputs of 10 stages of the counter. The stock identification code in the input read message is loaded into one of these coincidence circuits as determined to be available for use by the input/output control 98.

The stock identification code loaded into the available coincidence circuit 96 is compared therein with stock identification codes derived in succession from the storage drum 3 and coupled into the coincidence circuit in succession via the data buffers unit 67 (FIG. 3), an sic/PM buffer 99, and the sic load match circuit 95. At the same time, the permanent marker codes corresponding to the stock identification codes stored on the drum 3 are applied in succession to a PM and TM load match circuit 100, via the data buffers unit 67 (FIG. 3) and a temporary marker buffer 102. At such time as the stock identification code from the input read message matches a stock identification code from the drum 3, the permanent marker code and the temporary marker code corresponding to the matching stock identification code are applied to and "trapped" in selected ones of a plurality of storage trap circuits 103, under the control of enabling signals produced by the read coincidence and read buffer control 97.

At the time that the above stock identification code match is found and the permanent marker code and the temporary marker code have been trapped in the appropriate ones of the storage trap circuits 103, the coded SIC data record corresponding to the matching stock identification code is next located. As with the previously described read operations performed by the read/write interface 17, this data record is found on the drum 3 in the sector of the drum next following the sector in which the matching stock identification code was located. To locate the data record, the read coincidence and read buffer control 97 operates to produce and apply an output signal to a multiplexer control 105 at such time as the stock identification code match is found. The multiplexer control 105 operates in response to this output signal to control one of the data multiplexers in the data multiplexer unit 80 (FIG. 3) to receive and store therein four bits (4 bits out of 15 bits) from the binary drum address counter 37 (FIG. 3) representing the physical location of the data record in the next sector of the drum corresponding to the matching stock identification code. At the beginning of the sector next following the sector in which the matching stock identification code was located, the timing circuit 36 (FIG. 3) produces and applies a BEGINNING OF SECTOR signal to the read coincidence and read buffer control 97. The read coincidence and read buffer control 97 operates in response to this signal to produce an output signal to condition a read buffers unit 107 to receive and store therein the data record read from the drum 3, specifically, from six parallel tracks, and corresponding to the matching stock identification code. This data record is received by the data multiplexer unit 80 (FIG. 3) from the data buffers unit 67, together with the other data records in the same sector of the drum. The desired data record is selected from the several data records by the data multiplexer which was previously enabled by the four bits from the binary drum address counter 37.

After the data record corresponding to the matching stock identification code has been stored in the read buffers unit 107, this condition is detected by the input/output control 98 by monitoring the operation of the read coincidence and read buffer control 97. The input/output control 98 is then able to assemble a reply message to be returned to the requesting retriever 11. Specifically, the input/output control 98 operates to control the storage unit 94 to cause the retriever identification code stored therein to be non-destructively read out and to be applied to an output register 110. The input/output control 98 also operates to control the storage trap circuits 103 to cause the permanent marker code and the temporary marker code stored therein to be non-destructively read out and transferred to the output register 110. After the retriever identification code, the permanent marker code, and the temporary marker code have been applied to and stored in the output register 110, this information is caused to be transferred by the input/output control 98 to an output message control 111. At the same time, the input/output control 98 causes the read coincidence and read buffer control 97 to enable the read buffers unit 107 to transfer the desired data record therein to the output message control 111. The retriever identification code, permanent marker code, temporary marker code, and the desired data record applied to the output message control 111 are then assembled into a reply message and transmitted back to the requesting retriever 11.

After the transmission of the reply message has been completed by the output message control 111, the output message control 111 signals the input/output control 98 that this operation has been completed. The input/output control 98 then controls the read coincidence circuit 96 just used, via the read coincidence and buffer control 97, to change its status from "not available" back to "available."

While there has been shown and described what is considered a preferred embodiment of the invention, it will be obvious to those skilled in the art that various changes and modifications may be made therein without departing from the invention as called for in the appended claims.

What is claimed is:

1. A data processing arrangement comprising:

requesting input means operable to produce request messages specifying particular types of operations desired to be performed;

a plurality of operation circuits assigned to and used in the execution of the particular types of operations desired to be performed by the requesting input means and specified by request messages produced by the requesting input means;

first means coupled to the requesting input means and to the plurality of operation circuits for receiving request messages produced by the requesting input means and operative in response to each request message to determine whether an operation circuit assigned to the type of operation specified by the request message is available or unavailable to be used in the execution of the type of operation specified by the request message;

second means coupled to the first means and operative in the event the first means determines that an operation circuit is available to be used in the execution of a particular type of operation specified by a request message to produce an acknowledge signal; and third means coupled to the second means and operative to receive and transfer the acknowledge signal produced by the second means to the requesting input means.

2. A data processing arrangement in accordance with claim 1, further comprising:

storage means arranged to store information;

and wherein:

the requesting input means is operable to produce request messages specifying particular types of read operations desired to be performed for reading information stored by the storage means; and the plurality of operation circuits include read operation circuits assigned to and used in the execution of the particular types of read operations desired to be performed by the requesting input means and specified by request messages produced by the requesting input means.

3. A data processing arrangement in accordance with claim 1, further comprising:

storage means arranged to store information;

and wherein:

the requesting input means is operable to produce request messages specifying particular types of write operations desired to be performed for writing information in the storage means; and the plurality of operation circuits include write operation circuits assigned to and used in the execution of the particular types of write operations desired to be performed by the requesting input means and specified by request messages produced by the requesting input means.

4. A data processing arrangement in accordance with claim 1, further comprising:

storage means arranged to store information;

and wherein:

the requesting input means is operable to produce request messages specifying particular types of read and write operations desired to be performed for respectively reading information stored by the storage means and writing information in the storage means; and the plurality of operation circuits include read and write operation circuits respectively assigned to and used in the execution of the particular types of read and write operations desired to be performed by the requesting input means and specified by request messages produced by the requesting input means.

5. A data processing arrangement comprising:

a plurality of requesting input devices operable to produce request messages specifying particular types of operations desired to be performed;

a plurality of operation circuits assigned to and used in the execution of the particular types of operations desired to be performed by the requesting input devices and specified by request messages produced by the requesting input devices;

traffic controller means coupled to the plurality of requesting input devices and operable to scan the requesting input devices in succession and to detect request messages produced by the requesting input devices, said traffic controller means being operative in response to detecting a request message produced by one of the requesting input devices to transfer the request message to an output connection thereof;

status-determining means coupled to the traffic controller means and to the plurality of operation circuits for receiving each request message transferred by the traffic controller means to its output connection and operative in response to each request message to determine whether an operation circuit assigned to the type of operation specified by the request message is available or unavailable to be used in the execution of the type of operation specified by the request message; and acknowledge means coupled to the status-determining means and operative in the event the status-determining means determines that an operation circuit is available to be used in the execution of a particular type of operation specified by a request message to produce an acknowledge signal;

said traffic controller means being coupled to the acknowledge means and operative to receive the acknowledge signal produced by the acknowledge means and to transfer the acknowledge signal to the requesting input device producing the request message.

6. A data processing arrangement comprising:

requesting input means operable to produce request messages, said request messages including operation codes specifying particular types of operations desired to be performed;

a plurality of operation circuits assigned to and used in the execution of the particular types of operations desired to be performed by the requesting input means and specified by the operation codes in the request messages produced by the requesting input means, each of said operation circuits having a busy state during which it is busy with an operation as specified by an operation code in a request message and a not busy state during which it is not busy with an operation as specified by an operation code in a request message;

first means coupled to the requesting input means and to the plurality of operation circuits for receiving the request messages produced by the requesting input means and operative in response to the operation code in each request message to check the status of each operation circuit to determine whether it is busy with an operation or not busy with an operation and to produce an output status signal for each operation circuit which is not busy with an operation;

address means operative to produce a plurality of address signals in succession each corresponding to a different one of the operation circuits;

conversion means coupled to the address means for receiving the plurality of address signals produced by the address means in succession and operative to conert the address signals to a plurality of successive operation codes each corresponding to a different one of the operation circuits;

comparator means coupled to the conversion means and to the first means and operative to compare each of the operation codes produced by the conversion means with an operation code in a request message received by the first means and to produce an output signal when one of the operation codes produced by the conversion means matches the operation code in the request message;

logic circuit means coupled to the first means and to the comparator means for receiving the output status signals produced by the first means and the output signal produced by the comparator means, said logic circuit means being operative if an output status signal is received thereby contemporaneously with the output signal produced by the comparator means to produce an acknowledge signal indicating that an operation circuit assigned to the type of operation specified by the operation code in the request message is available to be used in executing the operation specified by the operation code in the request message; and means coupled to the logic circuit means and operative to receive and transfer the acknowledge signal produced by the logic circuit means to the requesting input means.

7. A data processing arrangement in accordance with claim 6 wherein:

the address means includes a counter.

8. A data processing arrangement in accordance with claim 6 wherein the address means includes:

a source of clock pulses; and a counter coupled to the source of clock pulses and operative to cumulatively count the clock pulses from the source of clock pulses and to produce address signals representative of the different counts.

9. A data processing arrangement in accordance with claim 6 wherein:

several of the operation circuits are assigned to and used in the execution of the same type of operation; and the conversion means is operative to convert a corresponding number of the address signals produced by the address means to the same operation code.

10. A data processing arrangement in accordance with claim 6 wherein:

the logic circuit means is further operative if an output status signal from the first means is received thereby contemporaneously with an output signal from the comparator means to produce an output control signal; and said data processing arrangement further comprises:

address storage means coupled to the logic circuit means and to the address means and operative in response to the output control signal produced by the logic circuit means to receive and store therein the address signal then being produced by the address means corresponding to the available operation circuit; and means coupled to the address storage means and to the plurality of operation circuits and operative to detect the address signal in the address storage means and in response thereto to mark the available operation circuit for subsequent use by the requesting input means.

11. A data processing arrangement in accordance with claim 6, further comprising:

storage means arranged to store information;

and wherein:

the requesting input means is operable to produce request messages specifying particular types of read operations desired to be performed for reading information stored by the storage means; and the plurality of operation circuits include read operation circuits assigned to and used in the execution of the particular types of read operations desired to be performed by the requesting input means and specified by request messages produced by the requesting input means.

12. A data processing arrangement in accordance with claim 11 wherein:

the storage means is further arranged to store clock pulses; and the address means includes counter means coupled to the storage means and operative to receive and cumulatively count the clock pulses stored by the storage means and to produce address signals representative of the different counts.

13. A data processing arrangement in accordance with claim 12 wherein the storage means includes a storage drum.

14. A data processing arrangement in accordance with claim 11 wherein:

several of the operation circuits are assigned to and used in the execution of the same type of read operation; and the conversion means is operative to convert a corresponding number of the address signals produced by the address means to the same operation code.

15. A data processing arrangement in accordance with claim 11 wherein:

the logic circuit means is further operative if an output status signal from the first means is received thereby contemporaneously with an output signal from the comparator means to produce an output control signal; and said data processing arrangement further comprises:

address storage means coupled to the logic circuit means and to the address means and operative in response to the output control signal produced by the logic circuit means to receive and store therein the address signal then being produced by the address means corresponding to the available read operation circuit; and means coupled to the address storage means and to the plurality of operation circuits and operative to detect the address signal in the address storage means and in response thereto to mark the available read operation circuit for subsequent use by the requesting input means.

16. A data processing arrangement in accordance with claim 6, further comprising:

storage means arranged to store information;

and wherein:

the requesting input means is operable to produce request messages specifying particular types of write operations desired to be performed for writing information in the storage means; and the plurality of operation circuits include write operation circuits assigned to and used in the execution of the particular types of write operations desired to be performed by the requesting input means and specified by request messages produced by the requesting input means.

17. A data processing arrangement in accordance with claim 16 wherein:

the storage means is further arranged to store clock pulses; and the address means includes counter means coupled to the storage means and operative to receive and cumulatively count the clock pulses stored by the storage means and to produce address signals representative of the different counts.

18. A data processing arrangement in accordance with claim 17 wherein the storage means includes a storage drum.

19. A data processing arrangement in accordance with claim 16 wherein:

several of the operation circuits are assigned to and used in the execution of the same type of write operation; and the conversion means is operative to convert a corresponding number of the address signals produced by the address means to the same operation code.

20. A data processing arrangement in accordance with claim 16 wherein:

the logic circuit means is further operative if an output status signal from the first means is received thereby contemporaneously with the output signal from the comparator means to produce an output control signal; and said data processing arrangement further comprises:

address storage means coupled to the logic circuit means and to the address means and operative in response to the output control signal produced by the logic circuit means to receive and store therein the address signal then being produced by the address means corresponding to the available write operation circuit; and means coupled to the address storage means and to the plurality of operation circuits and operative to detect the address signal in the address storage means and in response thereto to mark the available write operation circuit for subsequent use by the requesting input means.

21. A data processing arrangement in accordance with claim 6, further comprising:

storage means arranged to store information;

and wherein:

the requesting input means is operable to produce request messages specifying particular types of read and write operations desired to be performed for respectively reading information stored by the storage means and writing information in the storage means; and the plurality of operation circuits include read and write operation circuits respectively assigned to and used in the execution of the particular types of read and write operations desired to be performed by the requesting input means and specified by request messages produced by the requesting input means.

22. A data processing arrangement in accordance with claim 21 wherein:

the storage means is further arranged to store clock pulses; and the address means includes counter means coupled to the storage means and operative to receive and cumulatively count the clock pulses stored by the storage means and to produce address signals representative of the different counts.

23. A data processing arrangement in accordance with claim 22 wherein the storage means includes a storage drum.

24. A data processing arrangement in accordance with claim 21 wherein:

several of the operation circuits are assigned to and used in executing the same types of read and write operations; and the conversion means is operative to convert a first number of the address signals produced by the address means and corresponding to and used in executing the same type of read operation to the same read operation code and operative to convert a second number of the address signals produced by the address means and corresponding to the several operation circuits assigned to and used in executing the same type of write operation to the same write operation code, the read operation code being different from the write operation code.

25. A data processing arrangement in accordance with claim 21 wherein:

the logic circuit means is further operative if an output status signal from the first means is received thereby contemporaneously with the output signal from the comparator means to produce an output control signal; and said data processing arrangement further comprises:

address storage means coupled to the logic circuit means and to the address means and operative in response to the output control signal produced by the logic circuit means to receive and store therein the address signal then being produced by the address means corresponding to the available read or write operation circuit; and means coupled to the address storage means and to the plurality of operation circuits and operative to detect the address signal in the address storage means and in response thereto to mark the available read or write operation circuit for subsequent use by the requesting input means.

* * * * *